United States Patent [19]
Barry et al.

[11] Patent Number: 6,003,039
[45] Date of Patent: Dec. 14, 1999

[54] DATA REPOSITORY WITH USER ACCESSIBLE AND MODIFIABLE REUSE CRITERIA

[75] Inventors: Tim Barry, Jersey City; Flint Lane, Princeton Junction, both of N.J.

[73] Assignee: Platinum Technology, Inc., Oakbrook, Ill.

[21] Appl. No.: 08/883,283

[22] Filed: Jun. 27, 1997

[51] Int. Cl.$^6$ ............................................. G06F 17/00
[52] U.S. Cl. ..................... 707/103; 707/203; 707/201; 707/2; 707/102
[58] Field of Search .............. 707/1–206; 395/182.18

[56] References Cited

U.S. PATENT DOCUMENTS

| | | | |
|---|---|---|---|
| 5,673,199 | 9/1997 | Gentry | 364/490 |
| 5,734,899 | 3/1998 | Yoshizawa et al. | 707/103 |
| 5,745,674 | 4/1998 | Lupton et al. | 395/182.18 |
| 5,758,348 | 5/1998 | Neubauer | 707/103 |
| 5,813,009 | 9/1998 | Johnson et al. | 707/100 |

*Primary Examiner*—Paul R. Lintz
*Assistant Examiner*—David Yiuk Jung
*Attorney, Agent, or Firm*—Baker & McKenzie

[57] ABSTRACT

The invention disclosed herein is implemented in a repository which stores metadata relating to data stored in one or more databases. The repository includes a repository database in which the metadata is stored, one or more scanners each of which scans at least one database and obtains metadata therefrom, and one or more loaders each of which loads metadata obtained by at least one scanner into the repository database in accordance with the externalized reuse criteria. According to the invention, metadata stored in the repository is reused, for example, not replaced by identical metadata when the repository is updated or populated, and the criteria governing reuse is externalized, i.e., accessible and modifiable by a repository user. The reuse criteria accessible to repository users is stored separate from repository program code at a non-programming level such that the customer (user) can change the reuse procedures without an experienced programmer.

13 Claims, 15 Drawing Sheets

Sample PCAF Control File

```
PLATINUM Compressed Aggregate Format Control File v7.0.0
/*
1,DATABASE,50001      /* DATABASE ENTITY */
/*
/*
  5,DATABASE_NAME     /* ATTRIBUTE */
  5,DATAFLOW_NAME     /* ATTRIBUTE */
  5,CATALOG           /* ATTRIBUTE */
  5,FREQUENCY         /* ATTRIBUTE */
  5,LEVEL,S,C,3       /* SHADOW ATTRIBUTE */
/*
/*
  8,SFDLOAD           /* CONTAINER RELATE TEXT */
  7,COMMENTS          /* TEXT TYPE */
  8,LOCKING           /* CONTAINER RELATE TEXT */
  2,TABLE_AT,750000   /* TABLE_AT RELATIONSHIP */
  5,CREATOR           /* ATTRIBUTE */
  1,TABLE,50003       /* TABLE ENTITY */
  5,TABLE_NAME        /* ATTRIBUTE */
  4,OBJ_GRP,50089     /* OBJ_GRP CONTAINER */
  5,NAME              /* ATTRIBUTE */
  4,CATEGORY,50032    /* CATEGORY CONTAINER */
  5,NAME              /* ATTRIBUTE */
  0,TABLE             /* ATTRIBUTE */
```

Title Statement → PLATINUM Compressed Aggregate Format Control File v7.0.0
Comment
Object Type → 1,DATABASE,50001   /* DATABASE ENTITY */
Name
Identifier
Shadow
Data Type
Length In-line Comment
Object Statements

FIG. 8

Sample PCAF Data File

Title Statement → PLATINUM Compressed Aggregate Format Data File v.2.0.0
Comments → /*
                /*
Object Token → E,DATABASE,226,5,C8,CUSTOMER,V5,HELLO,S232,L12341234,C2,01
               R,TABLE_AT,5001,234,226,1,C7,CREATOR
               R,TABLE_AT,5002,235,226,1,C10,DB2CREATOR
               E,TABLE,234,1,V11,COBOL_TABLE
               E,TABLE,235,1,V13,BACHMAN_TABLE
               T,0,226,1,COMMENTS,23,Text on object token 226
               T,100,226,1,LOCKING,28,Text on the container relate
               T,101,226,1,SFLOAD,28,Text on the container relate
               C,OBJ_GRP,A,I,97,3,V17,BACHMAN_CONTAINER,C4,OPEN,S3
               C,CATEGORY,A,I,98,3,V9,CATEGORY1,C4,OPEN,S3
               C,CATEGORY,R,I,100,1,V9,CATEGORY4

} Object Statements

FIG. 10

```
#REUSE_RULE_SET
PRO_EXAMPLE
#REUSE_OBJECT
1,TABLE,1
#ORDER_ATTRS
#DRAIN_RELATES
COLUMNS,>
#PROC_PREFIX
PRO_EXAMPLE
#ACTION
#DEPENDENT_RELATE
    2,COLUMNS,>
    $FUNCTIONAL_KEY_NAME
    COLUMNS
    $ATTRIBUTE_INFORMATION
    SRC_INS_ID,L,4
    TGT_INS_ID,L,4
    TGT_TYP_ID,L,4
    NULL_INDICATOR,C,1
    SEQNUM,L,4
    $WORK_TABLE_NAME
    PRO_ORCL_WRKTBL
    $COLUMN_INFORMATION
    INS_TYP_NAME,CHAR,8,INS_TYP_NAME
    INS_ID,LONG,4,INS_ID
    SRC_INS_ID,LONG,4,SRC_INS_ID
    SRC_TYP_ID,LONG,4,SRC_TYP_ID
    TGT_INS_ID,LONG,4,TGT_INS_ID
    TGT_TYP_ID,LONG,4,TGT_TYP_ID
    SP_KEY2,CHAR,6,NULL_INDICATOR
    SP_KEY1,CHAR,6,SEQNUM
#FUNCTION_KEY_NAME
TABLE
#ATTRIBUTE_INFORMATION
NAME,C,35
#TEXT_PROCESS
O,DESCRIPTION
#WORK_TABLE_NAME
#COLUMN_INFORMATION
#WORK_TABLE_DEFINITION
PRO_ORCL_WRKTBL
#COLUMN_INFORMATION
INS_TYP_NAME,C,8
INS_ID,L,4
SRC_TYP_ID,L,4
SRC_INS_ID,L,4
TGT_TYP_ID,L,4
TGT_INS_ID,L,4
STATUS,C,1
SP_KEY1,C,6
SP_KEY2,C,6
```

Sample PCR File

FIG. 16

```
#DEPENDENT_RELATE
2,COLUMNS,>
$FUNCTIONAL_KEY_NAME
COLUMNS
$ATTRIBUTE_INFORMATION
SRC_INS_ID,L,4
TGT_INS_ID,L,4
TGT_TYP_ID,L,4
NULL_INDICATOR,C,1
SEQNUM,L,4
$WORK_TABLE_NAME
PRO_ORCL_WRKTBL
$COLUMN_INFORMATION
INS_TYP_NAME,CHAR,8,INS_TYP_NAME
INS_ID,LONG,4,INS_ID
SRC_INS_ID,LONG,4,SRC_INS_ID
SRC_TYP_ID,LONG,4,SRC_TYP_ID
TGT_INS_ID,LONG,4,TGT_INS_ID
TGT_TYP_ID,LONG,4,TGT_TYP_ID
SP_KEY2,CHAR,6,NULL_INDICATOR
SP_KEY1,CHAR,6,SEQNUM
```

Dependent Relate Block

FIG. 17

DATA REPOSITORY WITH USER ACCESSIBLE AND MODIFIABLE REUSE CRITERIA

BACKGROUND OF THE INVENTION

The invention disclosed herein relates to a data repository in which metadata stored in the repository is reused, for example, not replaced by identical metadata when the repository is updated or populated, and in which the criteria governing reuse is accessible and modifiable by a repository user.

In today's environment, most large organizations suffer from too much data and not enough information. An enterprise may have vast information assets in many different applications. These assets often were developed by different teams and may be scattered throughout the enterprise. For example, an enterprise may have a number of heterogeneous RDMSs (DB2, IMS, Sybase, Microsoft SQL Server, Oracle, Teradata, Informix). This makes it difficult to determine where information is located, and how it is being used. Without sufficient accounting, information redundancy, inconsistency and underutilization occur or grow.

Large legacy systems (e.g., COBOL, PL/I Assembler, C, JCL, SQL) represent still another information asset management problem. These systems were developed over many years; the code is often undocumented, lacks modularity and is replete with complex dependencies. As a result, maintaining legacy systems is typically resource intensive and in the context of the overall enterprise, the return on the use of the resources is low.

In large enterprises, it is not unusual for CASE analysts and programmers simultaneously to work on similar projects sometimes without knowledge of the other's work, which can result in costly duplication of effort and a lack of universal standards. This is yet another information management problem across an enterprise.

The data repository addresses all of these problems.

Data warehousing similarly presents the need for information about an organization's vast stores of data in order to make the data more accessible and usable. Through scrubbing, migrating, recalculating, translating, and other data manipulation efforts, these projects can offer information that was previously unavailable. In many cases, however, data warehousing efforts lack a metadata directory that allows information workers to find and understand this new data. While a business may spend thousands or millions of dollars creating a data warehouse, without descriptions of the available corporate data this effort is futile. The information workers must understand what data is available and where they can find it. The data repository provides this capability.

A data repository is a shareable collection of information supporting an organization's or enterprise's data and data processing functions. The data repository stores metadata, i.e., data about data, including data containing descriptions and definitions of the structure, content, keys, indices, etc. of other data, applications and systems components. A data repository may also be a place of record for other information assets, such as queries, reports, and documents that benefit from sharing. The metadata for generally maintaining, running, analyzing, modifying and updating data and applications may be used and shared for many purposes, including, to name a few, data modeling, tool development, application development, CASE support, data warehousing support, impact analysis, and data resource management.

Among the benefits that a repository provides are the following.

(1) Makes the application development process more efficient through: better utilization of existing resources (no one person needs to be skilled at all implemented data bases and tools in an organization); identification of data redundancies (data rationalization); establishing naming standards (data rationalization); identification of opportunities for reuse of standard definitions across disparate tools; providing impact analysis (assess where data is used before implementing a change; support of data sharing (one place to share multiple modeling efforts (e.g., CASE) and consistent definitions; providing an inventory of existing data structure models (for example, those that contain year 2000 affected fields); leverages investment in legacy systems with the ability to inventory and utilize existing application information.

(2) Offers an opportunity for central point of control for data through: providing a place of record for data about an organization's information assets (like a card catalog for all data); provides a universal relational model for heterogeneous RDBMSs to interact and share information thus providing an unlimited opportunity for data documentation (far more than a typical DBMS); supportilng model extensibility to include metadata definitions from non-traditional sources and recording data ownership/stewardship.

(3) Leverages data across the enterprise so an organization can be more competitive by: understanding data properties, uses, locations, characteristics, owners, and relationships; providing organization and documentation of data audit trail (where data comes from and how it is changed) so information can be repeatedly derived with consistent results.

(4) Aids in the downsizing and/or migration to client/server architecture by: assessing and documenting what data is available today before initiating future data architectures and migrations; facilitating the migration process by generating physical data structures from existing data definitions.

(5) Assists with data warehousing by acting as a guide to warehouse sources, targets, and data translations (relationships between elements), and by capturing versions of warehouses—snapshots of moment in time.

A data repository may be populated with database metadata by scanning the database's code, identifying data to be imported into the repository, preparing metadata and loading the metadata into the repository. Since data existing in the repository prior to a load may be identical to data obtained from a database scan, the identical data was reused, i.e., the scanned identical data was not loaded into the repository. Without such data reuse, (1) a data load took much more time that necessary, and in a repository for a large number of databases and applications, could make the repository unworkable; and (2) identical data could be stored multiple times, which spawned still further problems related to memory waste and version control.

Data reuse in other applications by caching is described in U.S. Pat. Nos. 5,511,208 and 5,404,488, UK patent publication GB 2,294,132A and International Publication WO 95/16956.

While a data repository provides many benefits, as for example described above, without the invention disclosed herein, prior repositories suffered from a serious drawback: hard-coded reuse criteria which was not accessible by a repository user. This made data reuse in the repository inflexible and impractical since an experienced programmer was needed to change the reuse criteria. This drawback drastically diminished the effectiveness of a repository, and without user access to the reuse criteria, repositories still had essentially the same serious problems discussed above.

SUMMARY OF THE INVENTION

It is an object of the invention disclosed herein to improve the operation and/or performance of data repositories.

It is another object of the invention to reduce the complexity and time involved with populating a data repository.

It is another object of the invention to provide for user access to the criteria or procedures for data reuse in data repositories so that the user can change the criteria.

It is another object of the invention to provide such user access at a non-programming level so that the reuse criteria can be changed without an experienced programmer.

The invention achieves the above and other objects by making the reuse criteria accessible to repository users separate from repository program code such that the user can change the reuse procedures. As described herein, the reuse criteria is made accessible at a non-programming level such that the user can change the reuse criteria without changing program code.

In the preferred embodiment, the reuse criteria is stored in reuse files accessible and chengeable by a user at a non-program code level.

The invention is implemented in a repository which stores metadata relating to data stored in one or more databases. The repository includes a repository database in which the metadata is stored, one or more scanners each of which scans at least one database and obtains metadata therefrom, and one or more loaders each of which loads metadata obtained by at least one scanner into the repository database in accordance with reuse procedures or criteria which govern reuse of metadata already stored in the repository database. In accordance with the invention, the reuse procedures are stored a data storage medium accessible to a user of the repository separate from repository program code such that the user can change the reuse procedures. In the preferred embodiment, the data storage medium stores the reuse procedures on a non-programming level in reuse files such that the user can change the reuse procedures without changing program code.

In one embodiment, each scanner obtains metadata from a database and stores the metadata in at least one file which contains the scanned metadata and associated control information for loading the metadata in the repository database. In the preferred embodiment, each scanner stores metadata from a scan in a data file which is associated with control information in a control file for loading the metadata in the associated data file into the repository database in accordance with reuse procedures in an associated reuse file.

The invention also encompases methods for providing reuse criteria for a repository, and for loading a repository. The method of providing reuse criteria comprises storing the reuse criteria in a file separate from the program code and at a non-programming level.

A method according to the invention for populating a repository with metadata relating to data stored in at least one database comprises scanning a data base and obtaining metadata relating to data stored in the database, storing reuse procedures which govern reuse of metadata already stored in the repository accessible to a user of the repository separate from repository program code such that the user can change the reuse procedures; earching the repository for metadata that matches metadata obtained from scanning the database in accordance with the reuse procedures, and loading into the repository metadata obtained from scanning for which matching metadata was not found from searching the repository.

As indicated above, in the preferred embodiment, the reuse procedures are stored on a non-programming level as reuse files, the metadata obtained from scanning is stored in a data file, and the control information is stored in a control file.

The method may populate the repository with metadata relating to data stored in at least one relational database which stores data objects having attributes. There, scanning obtains information relating to objects stored in the database, and the repository is searched for metadata that matches metadata about an object obtained from scanning the database in accordance with the reuse procedures. Then, metadata about an object obtained from scanning for which matching metadata was not found from searching the repository is loaded into the repository in accordance with the control information associated with the object being loaded.

BRIEF DESCRIPTION OF THE DRAWINGS

The invention is illustrated in the figures of the accompanying drawings which are meant to be exemplary and not limiting, in which like numerals in the different figures refer to like or corresponding parts, and in which:

FIG. 8 depicts a representation of a sample PCAF Control file;

FIG. 10 depicts a representation of a sample PCAF Data file;

FIG. 16 depicts a representation of a sample PCAF Rules file;

FIG. 17 illustrates a complete dependent relate block for the #DEPENDENT_RELATE section of the PCAF Rules file.

DESCRIPTION OF THE PREFERRED EMBODIMENTS

Relational Databases and ER Models

The invention provides a solution to the lack of user access to reuse criteria in prior repositories, and provides other advantages and features which greatly improve repositories.

The invention is particularly applicable to repositories which store metadata of relational databases such as DB2, IMS, Sybase, Microsoft SQL Server, Oracle, Teradata, Informix. Therefore, description herein will focus on relational databases and the entity relationship ("ER") model. A brief discussion of relational databases and ER models follows.

A relational database links files (or records) together as required, and relationships between files are created by comparing data such as account numbers and names. In the relational model, data and relationships among data are represented by tables (files), the rows of which are referred to as tuples or records and the columns of which are referred to as attributes. The ER model describes attributes of entities and the relationship among them.

Many different opinions exist as to what components constitute an ER model. The typical ER model has two basic components; entities and relationships. An entity is simply a unit of data or a record in the data repository. It can be any person, place, concept, idea, object, or policy defined to the repository. Each entity is composed of a set of attributes. The attributes themselves are values for certain characteristics known as attribute types.

When multiple entities have the same set of attribute types they are said to be of the same entity type, which may be viewed simply as a table of data. The columns of data represent attribute types, the rows represent the entities themselves, and the individual sections of the table represent the attributes of the entities. Tables 1 and 2 illustrate these concepts, Table 1 being a generic representation and Table 2 a specific representation or instance.

TABLE 1

ENTITY TYPE: EXAMPLE

|  | Attribute Type 1 | Attribute Type 2 | Attribute Type 3 |
|---|---|---|---|
| Entity A | attribute | attribute | attribute |
| Entity B | attribute | attribute | attribute |
| Entity C | attribute | attribute | attribute |
| Entity D | attribute | attribute | attribute |

TABLE 2

ENTITY TYPE: EMPLOYEE

|  | NAME | SOCIAL SECURITY NO | DATE OF BIRTH |
|---|---|---|---|
| Entity A | J. Adams | 000-00-0000 | 34/07/04 |
| Entity B | B. Franklin | 000-00-0001 | 17/07/04 |
| Entity C | P. Henry | 000-00-0002 | 40/09/25 |
| Entity D | G. Washington | 000-00-0003 | 25/02/01 |

Figure 1:
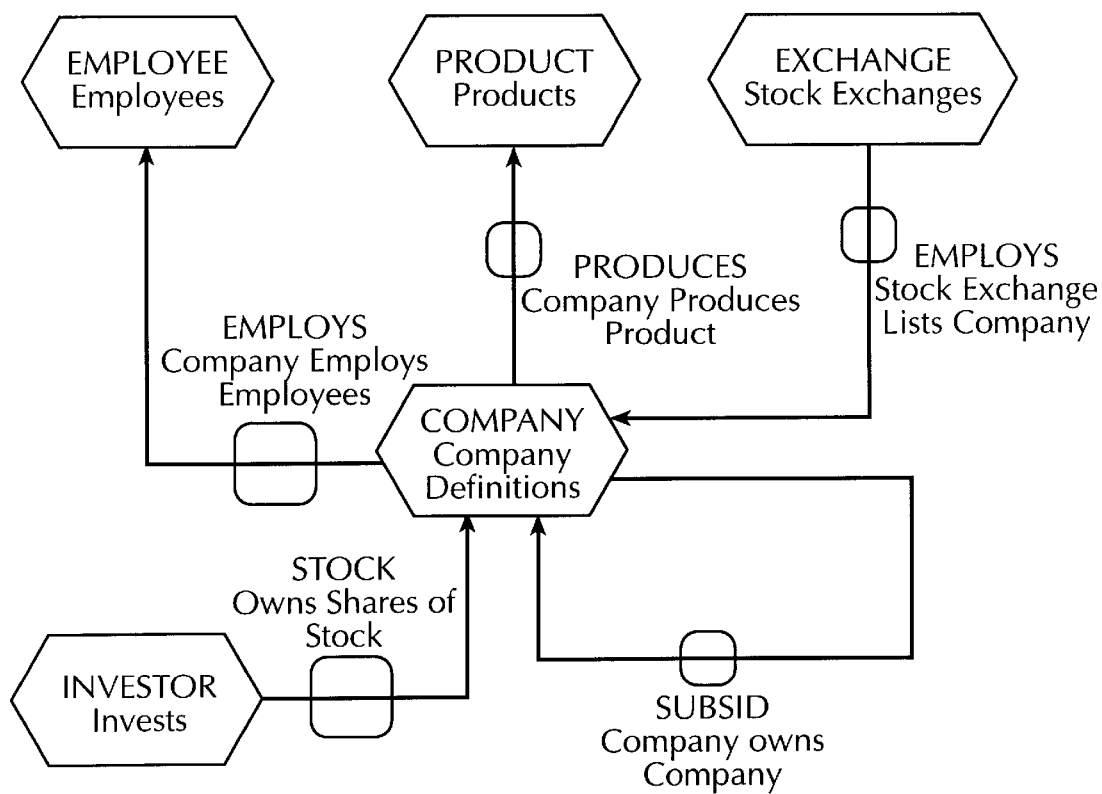
FIG. 1 is an entity relationship ("ER") diagram illustrating entity type and relationship types, and also illustrating a sample collection.

In the above illustration, Entity A (here an individual) is defined in the repository as belonging to the entity type EMPLOYEE. All entities belonging to the entity type EMPLOYEE must have attributes that correspond to the attribute types NAME, SOCIAL SECURITY NUMBER, and DATE OF BIRTH respectively. Entity A has the attributes "J. Adams," "000-00-0000," and "34/07/04." Five entity types within an ER data model are shown in FIG. 1, in which entity types are represented by hexagons.

Relationships are like entities with one exception: each relationship must have both a source and target specified as part of its definition. The source or target of a relationship can be either an entity or another relationship. Relationships may be attributed or unattributed. Like an entity type an attributed relationship type has attributes, and it links together two other entity or relationship types. One of these entity or relationship types serves as the source and the other serves as the target of the attributed relationship type.

The attributes of both the source and target entity or relationship types are key attributes described below, and are among the attributes of the new relationship type. In addition, the new relationship type has additional attributes that describe the relationship itself In Table 3 below, the relationships A–D belong to the attributed relationship type EXAMPLE.

TABLE 3

ENTITY TYPE: EXAMPLE

|  | Source: Entity Type | Target: Entity Type | Attribute Type 1 | Attribute Type 2 | Attribute Type 3 |
|---|---|---|---|---|---|
| Relationship A | entity | entity | attribute | attribute | attribute |
| Relationship B | entity | entity | attribute | attribute | attribute |
| Relationship C | entity | entity | attribute | attribute | attribute |
| Relationship D | entity | entity | attribute | attribute | attribute |

While the entities listed in the source column need not be the same entity, they must all be of the same entity type in order for these relationships to be of the same relationship type. This is also true of the target entities. In simpler terms: relationships point to entities and relationship types point to entity types.

Table 4 below illustrates a specific instance of Table 3, using the entity, type EMPLOYEE from Table 2.

TABLE 4

ENTITY TYPE: EMPLOYEE

|  | Source: COMPANY | Target: EMPLOYEE | POSITION | DATE OF HIRE | SALARY |
|---|---|---|---|---|---|
| Relationship A | Valuesoft | J. Adams | System Engineer | 76/07/04 | $32,000 |
| Relationship B | ABC Factory Ltd. | B. Franklin | CADD Engineer | 76/07/04 | $40,000 |
| Relationship C | Relate Technology | A. Hamilton | Architect | 89/08/21 | $30,000 |
| Relationship D | Pyramid Corp. | P. Henry | Software Developer | 90/02/12 | $27,500 |

The basic purpose of a relationship is to link two entities. The data stored in a relationship will, in most cases, only be relevant with respect to the source and target of the relationship. In Table 4 above, for example, the meaning of the data stored under the attribute type "POSITION" becomes obvious only when retrieved with a source company and a target employee.

In FIG. 1, relationship types are represented by a round-cornered rectangle placed over an arrow. The arrow starts at the source of the relationship and points to the target.

An unattributed relationship, like an attributed relationship, joins two entities. Unlike an attributed relationship, an unattributed relationship has no attributes other than a source and a target. While an unattributed relationship allows two entities or attributed relationships to be related, it does not hold any special information about the logical joining of the entities or attributed relationships that it connects. In the above example, companies are linked to products. However, because additional information concerning these linkages was not required, an unattributed relationship was used instead of an attributed relationship. Referring to FIG. 1, relationship types, represented by named arrows starting at the source of the relationship and pointing to the target, are labeled as attributed or unattributed.

Another important concept relating to entities and relationships is that of key attributes. A key attribute is an attribute or combination of attributes that serves to uniquely identify an entity. The key attributes of all entities and relationships are represented by the attribute types NAME, STATUS and VERSION. NAME is a character description, which, in many cases, will by itself identify an entity to a user. STATUS refers to the entity's phase in the application life-cycle (for example, Test, Production, etc.). VERSION allows multiple copies of the same entity (name) to exist in the same phase of the application life cycle (STATUS). Though the actual names of the attribute types used for these keys can differ from one entity type to another, they must always be present in one form or another. In most cases they will be recognizable by their function as described above. Because these attributes are designed to be unique identifiers, no two entities or relationships of a particular entity type, relationship type, or entity set can have the same name, status, and version.

An entity set is a variation of an entity type. It is a class or category of entity, i.e., a set of entities of the same type. It represents a group of entities that can, for most purposes, be used interchangeably. By defining sets, several additional relationship types can be left out of a repository model. If, for example, an entity set was the source entity type of a relationship type, entities from any of the entity types belonging to the set could be used as source entities. Without the set, a different relationship type would be needed to point to each entity type in the set.

In addition to the basic model (entity type, relationship type and attributes) described above, the repository described herein employs the following data models: Collection, Directed Collection and Directed Instance Collection. These models allow viewing on a smaller scale, focusing on the entities of interest. A Collection groups entities based on a common functional area. For example, all the entities that are needed to work with Oracle are included in the Oracle Collection. A Directed Collection groups and displays related entities and relationships around one entity type. For example, a Directed Collection with TABLE as the root entity type might include a subset of only the fundamental entity and relationship types that are directly related to TABLE. A Directed Instance Collection groups entity and relationship instances within a Directed Collection.

A Collection is a logical grouping of entities and relationships within the repository model based on a specific topic. It gives a smaller view of entities that are related specifically to one topic without having to locate individual entities and tracing the relationships on a larger model. FIG. 1 shows a model of all the entities and relationships contained in the Collection. The large shapes represent entities, and the lines with small shapes represent the relationships between entities. Entities and relationships included in the Collection may be viewed together, which facilitates model rearrangement, editing and creation of new relationships between instances.

Figure 2:
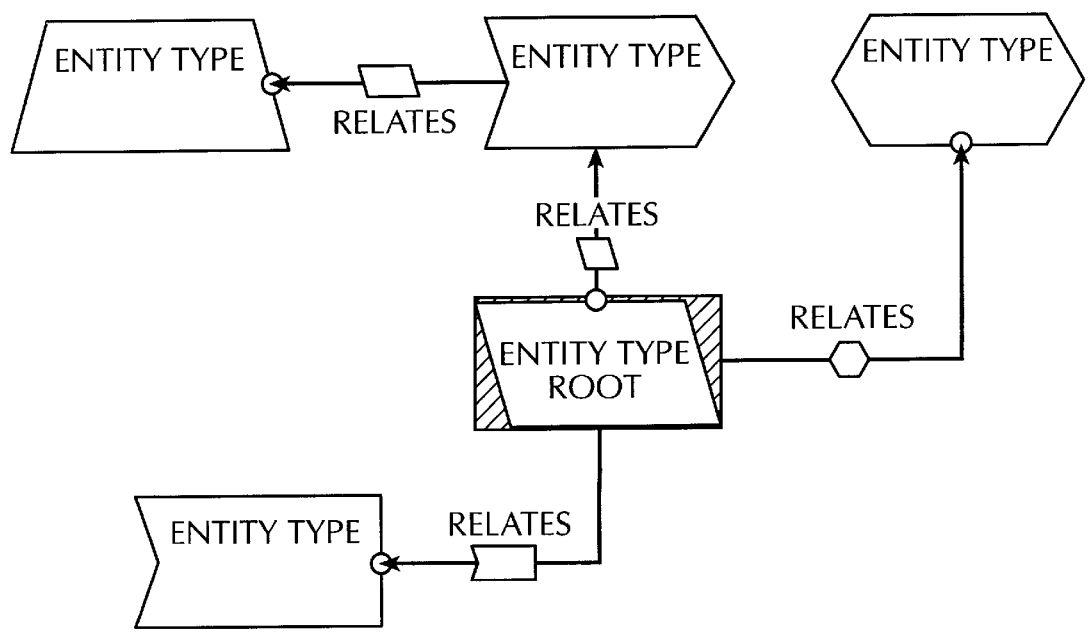
FIG. 2 is a diagram illustrating a sample Directed Collection.

A Directed Collection groups and displays related entities around one entity type. This entity type is known as the root for the Directed Collection, and may be identified on the model with a black outline and a shadow, for example, as shown in FIG. 2. Directed Collections are helpful for focusing on only those entities that are fundamental and related to a specific entity type. For example, when defining a TABLE, concentration may be directed to only those entities that are significant to the table's definition, such as columns, keys, indexes, and table space. Directed Collections are not necessarily subsets of single specific collections. They may span related entity types across multiple collections.

Different Directed Collections allow viewing of as little or as much as needed of the path spanning related entity types. Directed Collections are also used in performing impact analysis. Directed Collections also allow customization of the view of the impact such that only specific entity types of concern are shown. For example, there may be times when the only impact information needed for an Element is Column and Table, and other times all impacted entities between Element and Job are needed. Directed Collections allow viewing of specific entities and hiding of others which are not of interest.

Entities and relationships based on a root entity type may be viewed in the Directed Collection, which facilitates model rearrangement, editing and creation of new relationships between instances.

Figure 3:
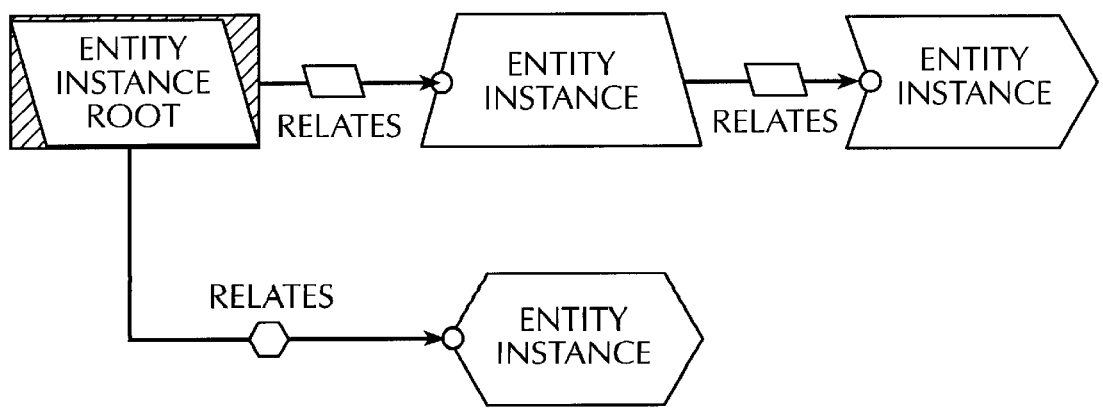
FIG. 3 is a diagram illustrating a sample Directed Instance Collection.

A Directed Instance Collection groups together entity and relationship instances related to a specific entity type, or root, as illustrated by the sample Directed Instance Collection shown in FIG. 3. The Directed Instance Collection model graphically displays the entity instances related to the root entity. Directed Instance Collections are helpful in viewing entity instances that are related to the root entity instance, and provide the details of the entity instances and their relationships, and allow the insertion, updating and deletion of instances, and the viewing of the impact of changes to the entity instance root.

Another model used by the repository described herein is a Container, which is an entity type that allows grouping together of entity and relationship instances without regard to their types or the rigid rules controlling how they can participate in a Collection, Directed Collection, or Directed Instance Collection. The following may be achieved with Containers. A desired group of instances can be created for a special purpose. For example, a Container can be created that links together all Data Elements in COBOL copybooks which were imported into the repository and are to be maintained. Instances may be retrieved and viewed that would otherwise be unavailable because the Collections in which they are stored do not share the same entity types. A user responsible for enforcing icon consistency throughout an organization could, for example, set up a container holding all instances of icons uploaded to the repository from scans of GUI source code, regardless of the source language. Groups of instances may be viewed without their dependent relationships.

Repository Architecture

Figure 4:
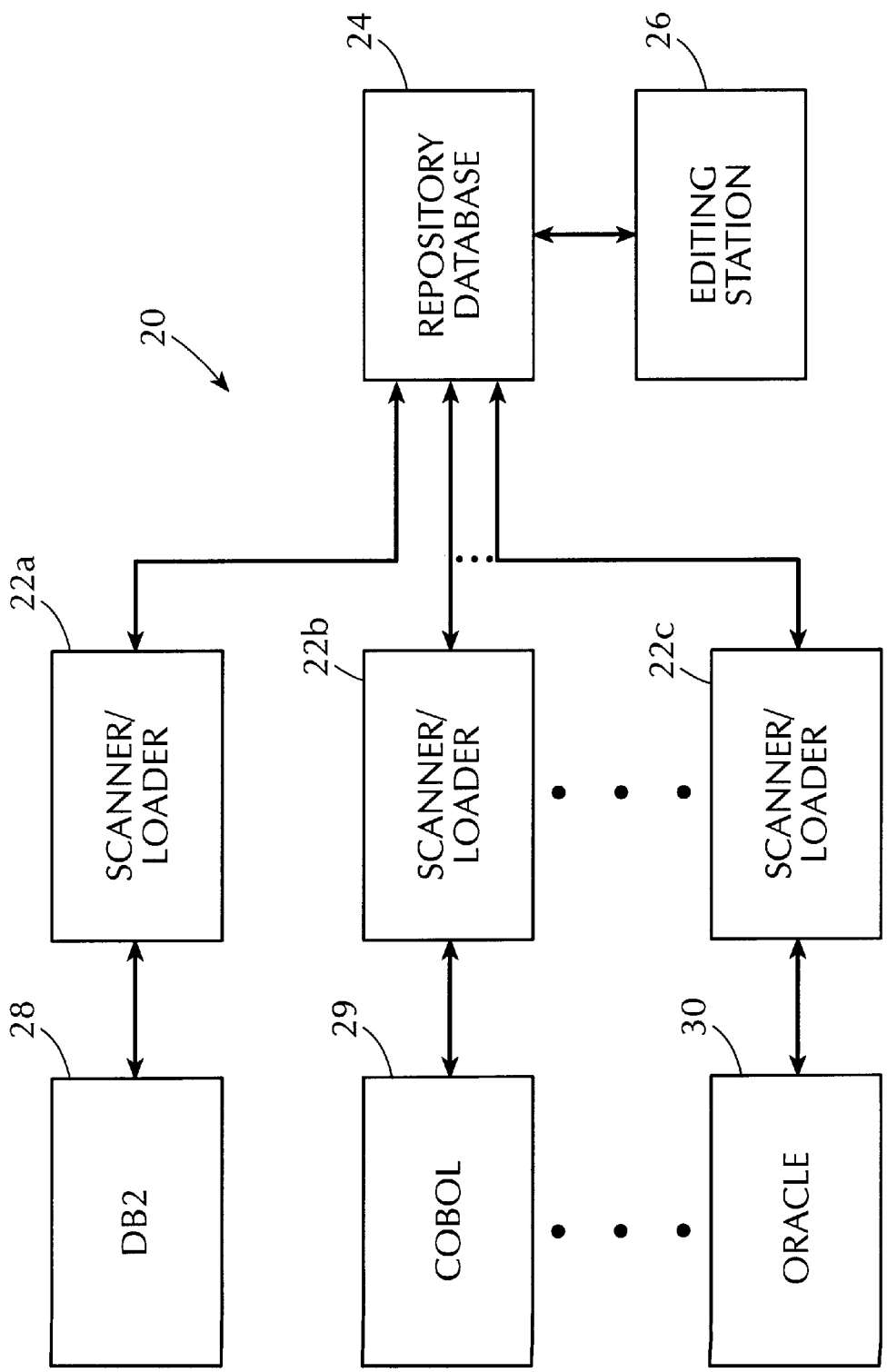
FIG. 4 is a block diagram of a conventional repository.
Figure 5:
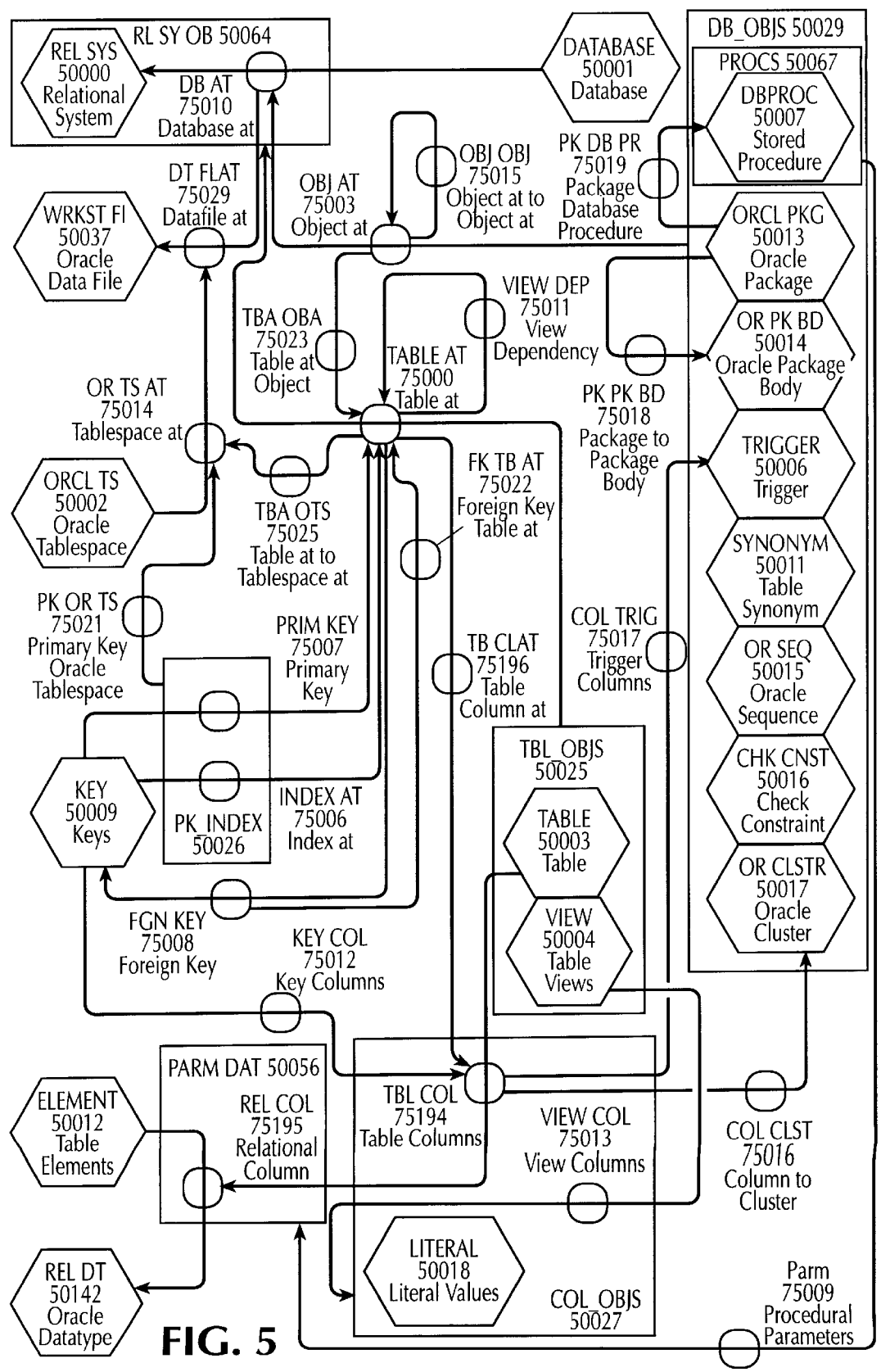
FIG. 5 exemplifies the type of diagram that may be viewed on a display screen of the repository, specifically illustrating repository Objects for storing Sybase DBMS definitions.

Referring to FIG. 4, a conventional repository 20 includes scanner/loaders 22, a repository database 24, and terminals with displays for accessing the repository database including one or more editing stations 26. (While the data itself is stored in the repository database, reference may be made herein to loading or populating the repository or the repository database.) A scanner/loader 22a–c scans the code in a database 28, 29, 30 (DB2, COBOL, ORACLE, etc.), respectively, to identify desired information about the data in the database, converts the information into data suitable for storing in the repository database 24, and loads the data into the repository database. Each editing station 26 has access to the data in the data repository for viewing and modifying the data. The editing station 26 includes a viewer which operates similar to a browser to display repository data. (Separate read-only viewers may also be provided.) Views similar to that shown in FIG. 5 may be displayed on the displays of the editing stations.

The repository 20 (FIG. 4) was populated by a separate scanner/loader tool 22a–c for each database source 28, 29, 30, respectively. Each scanner/loader 22a–c incorporated a scanner and a loader. Not only was each scanner dedicated to scanning code in a given database 28, 29, 30, but also each loader was dedicated to loading data from only one database. The scanner wrote to data files which required hard-coded program links to the repository database. The loader performed the parse, map-to-target, and load and merge functions in accordance with the reuse criteria, all pursuant to hard-coded program code. Thus, a programmer was needed to change the reuse criteria. The system 20 was inflexible, hard to change and closed.

Figure 6:
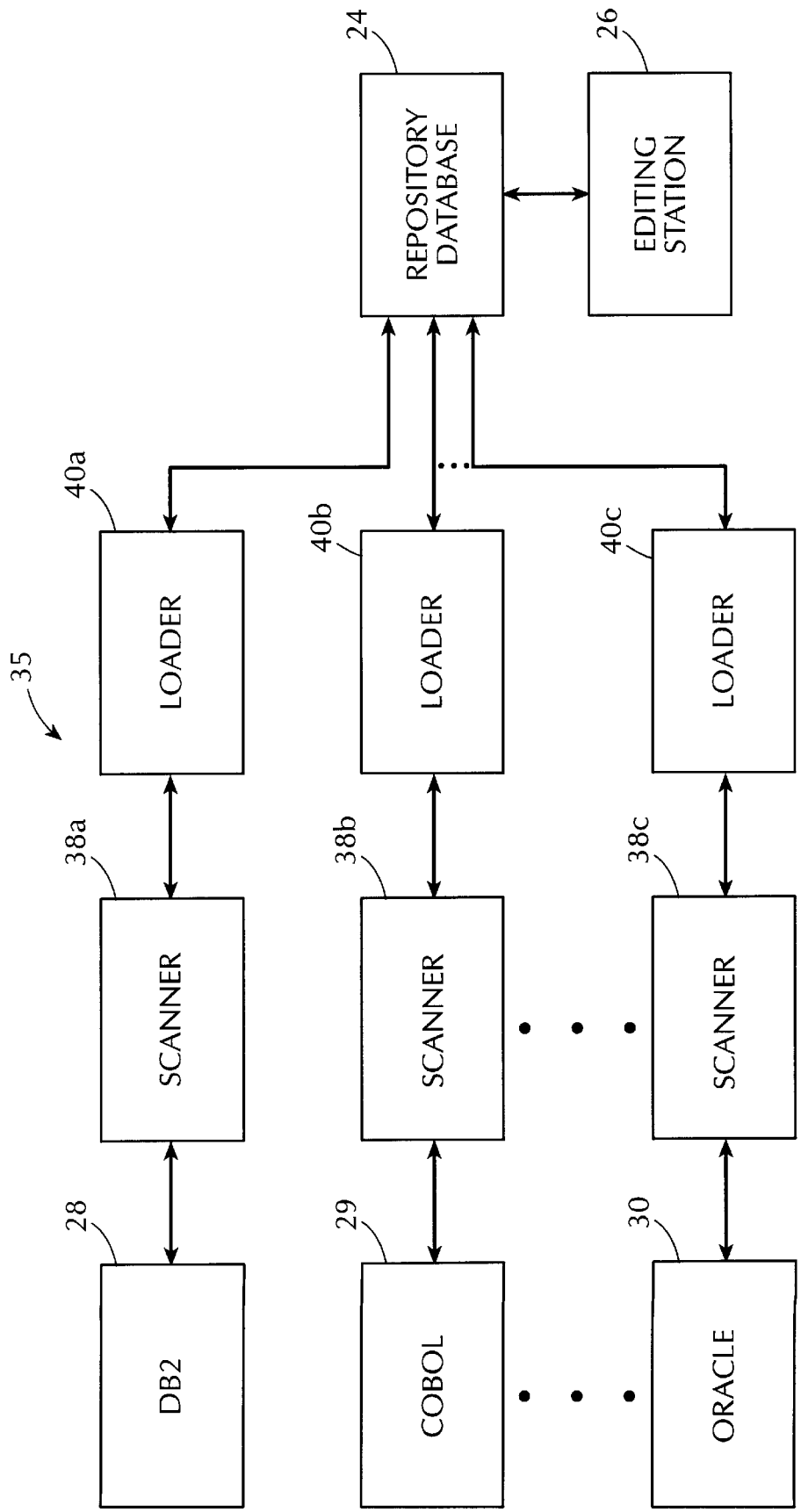
FIG. 6 is a block diagram of an improved repository.

In the improved repository 35 shown in FIG. 6, the scanners 38a–c and loaders 40a–c were separated to provide separate scanning and loading functions. A scanner 38a–c was provided for each database source 28, 29, 30, respectively, and was a specialized set of tools for scanning database code and importing information about program elements into the repository, and for using repository data to generate new program elements.

The scanners 38a–c of the system 35 wrote to files which were not linked by hard code to the repository database. The loaders 40a–c read these files and loaded the data into the repository in accordance with stored procedures. System 35 reduced the restraints on and the control needed for the scanners 38a–c and facilitated change of the procedures which governed reuse.

For example, scanner 38a may be a Scan/COBOL scanner provided by Platinum Technology, Inc., which is a specialized set of tools for scanning COBOL, importing information about its program elements and generating new program elements such as copylibs. Maintaining data using the Scan/COBOL scanner includes several steps. First, the COBOL data is developed until it has reached a point where it needs to be shared throughout the organization. This data is then imported into the repository and migrated into a valid life cycle status to create a single definition that can then be renamed to or merged with its permanent name. When information in the repository is again needed, it can be exported. Entities that are to be exported can be provided with a work station affilliation and locked as a group. This import-export cycle can be repeated as often as is necessary to complete a system. To simplify exporting, repository entities retain their workstation affiliation so they can easily be exported again as changes to the data are required.

The Scan/COBOL scanner automatically: identifies components of programs and copylibs, including data elements and file definitions; recognize embedded SQL Data Manipulation Language (DML), and identifies its components (such as tables, columns and host variables); records instances of copybooks, programs and their components. The Scan/COBOL scanner parses embedded DML and stores references to tables, columns, relational statements and host variables, and uses the information in the repository to regenerate copylibs in the COBOL program. For example, after the data in the repository has been analyzed, it may be discovered that the COBOL copybook has levels that are never used, which can be eliminated using the repository tools and then regenerate a new COBOL copylib.

Once the COBOL data has been developed to the point where it can be shared throughout an organization, it can be imported it into the repository. Importing COBOL data consists of two basic steps, (I) creating a data file using the Scan/COBOL scanner; (2) importing the data file into the repository using the loader 40.

Further details regarding the Scan/COBOL scanner may be found in the "Platinum Repository/OEE Scan/COBOL User Guide for Windows NT, Version 1.3.0", the disclosure of which is incorporated herein by reference. Platinum Technology, Inc. also provides sanners for other databases.

Figure 7:
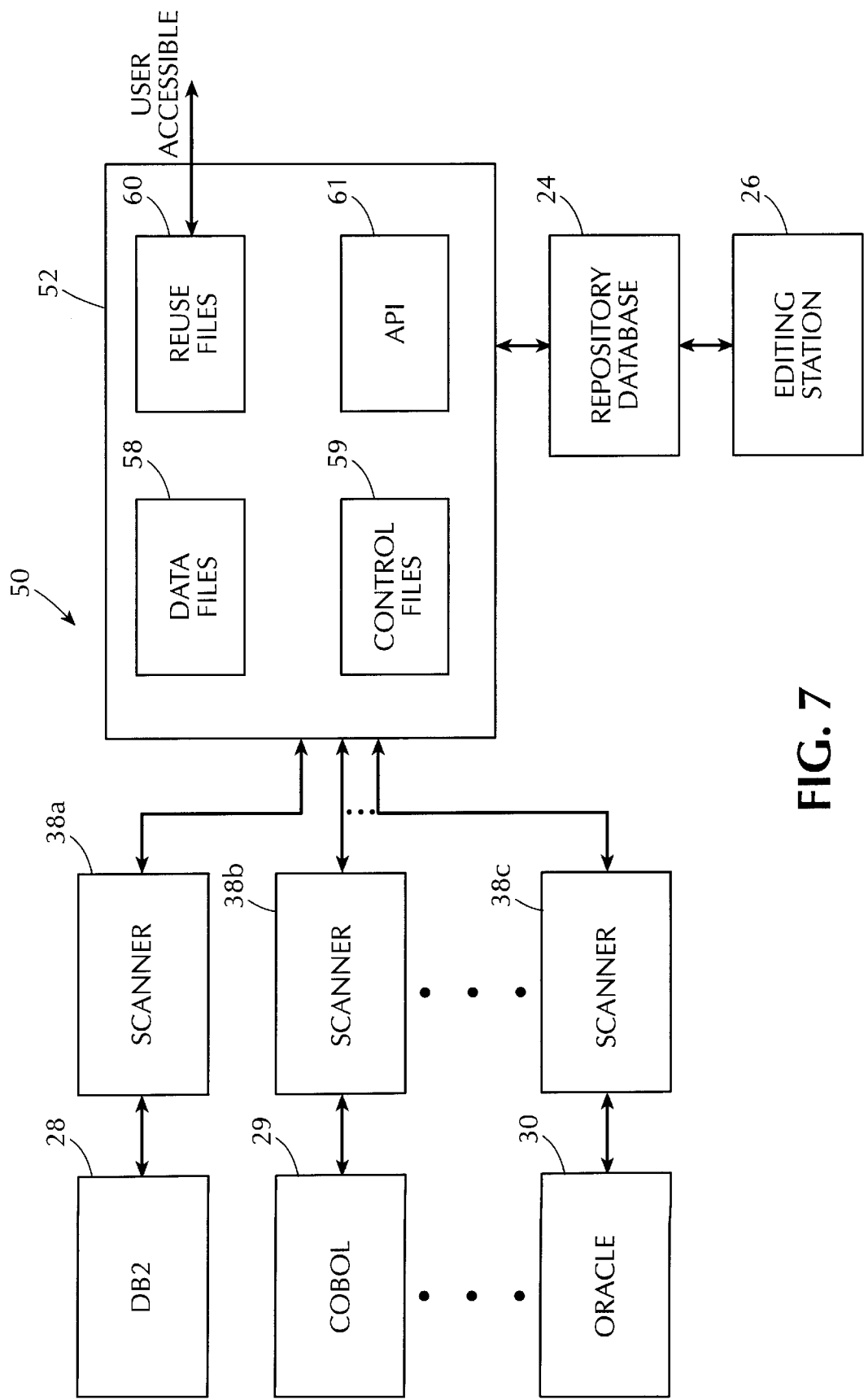
FIG. 7 is a block diagram of further improved repository with metadata reuse.

FIG. 7 shows a repository 50 which incorporates the invention and includes the scanners 38a–c but only a single loader 52 common to all of the scanners 8a–c. Repository 50 employs a file-based system for storing scanned information and for loading metadata into the repository database 24. The database information provided by the scanners 38a–c is stored in data files 58, and in control files 59 which contain the control information for loading the data into the repository database 24. In accordance with the invention, reuse rules for searching the repository database 24 for identical existing data are provided as separate user accessible files 60. This system of data, control and reuse files, discussed in detail below, is called the Platinum Compressed Aggregate Format ("PCAF") file system. A set of PCAF files, including reuse rules, is provided for each database source 28, 29, 30. With this file-based system, the scan and load functions are not hard-coded.

The common loader 52 then loads the data in the PCAF data files 58 for a given database source into the repository database 24 after determining via the reuse criteria or rules contained in the reuse files 60 that the metadata for a particular source (object) is not already present in the repository database 24. The PCAF file system is described in more detail below.

The loader 52 includes a suitable Repository Services ("RS") API 61 (discussed below) for searching the repository and loading the data into it.

The data in the repository 24 may be edited in an editing station 26 which may include a viewer as discussed above. Alternatively, an improved viewer called a Data Shopper may be used. The Data Shopper is a read-only application which accesses the repository. As such, users and data administrators alike need not worry about data corruption, regardless of how the tool is used. The Data Shopper differs from a repository editor which provides full access to the data repository, allowing users to add, change, and delete metadata. Editors are intended for individuals responsible for maintaining the metadata stored in the repository. Data Shopper, by contrast, is a browsing tool intended for end-users. The level of complexity required for the repository editors is absent, making Data Shopper far easier to learn and to use.

Further details regarding the Data Shopper may be found in the "Platinum Repository/OEE Data Shopper User Guide for Windows, Version 1.3.0", the disclosure of which is incorporated herein by reference.

Reuse

The discussion of reusability herein uses specialized meanings of the following terms.

Objects: Single entities and relationships, or groups of entities and relationships, that represent some external construct (for example: Relational Table, JCL Proc, etc.).

Source Objects: Objects to be inserted into the repository, and for which reuse matches with Target Objects are sought.

Target Objects: Objects in the repository for which reuse matches are sought with Source Objects.

Functional Key: The set of attributes that specify reusability criteria for the Source Object. These attributes can span multiple repository entities and relationships.

Candidates: Any objects that meet the reusability criteria (match the Functional Key) for the Source Objects.

Simple Functional Key Reuse is the simplest case of reusability. A Functional Key is a set of attributes on an entity that define the entity in the context of the tool (discussed below) that is inserting the entity into the repository. For example, suppose we want to insert a data ELEMENT entity into the repository, the Functional Key for an ELEMENT is simple and in a COBOL scan context, consists of the main COBOL attributes (COBOL_NAME COBOL_DATA_TYPE, etc.). In the context of a Sybase catalog import, the Functional Key is the SYBASE_NAME, SYBASE_DATA_TYPE, etc. Not only is the NAME of the ELEMENT not part of the Functional Key, but the Functional Key changes for different contexts. This allows the same ELEMENT instance to be used in different contexts.

Other objects have Functional Keys that span multiple entities and relationships. For a Sybase TABLE object, two tables can have the same name and not be the same logical table. At the very least, two tables must have the same columns, with the same data types, in the same order, in order to be considered equivalent. One could similarly expand the definition of reuse to include indexes, foreign keys, etc. The point is that Functional Keys can span simple repository entities and relates.

In some cases, the attributes of the relation between the entity in question and its children and parents must be checked in order to decide if there is a match. This is a secondary case of a Functional Key check called Single-level. One-to-One Reuse. In this case, the definition of the Functional Key expands to include both the relevant attributes of the root entity, and the relevant attributes of the relationship and entities that also describe a reuse match. Two entities can have the same attributes but they will be different if they have relationships to different entities with different attributes. A good example of this case is the ENT_TYP entity from the CASE models. Here, two ENT_TYP are the same only if the, have a link to the same underlying TABLE entity. The Functional Key consists of the relevant attributes of the ENT_TYP, the TABLE, and the LP_LINK that connects them.

This case is characterized as a single-level one-to-one reuse because it can only have a one-to-one relation from ENT_TYP to TABLE. Hence, an ENT_TYP entity can only relate to only one TABLE entity. There are no repeating groups. This is not to say that a one-to-one reuse cannot consist of many one-to-one relationships from the root item.

Single-Level, One-to-Many Reuse is similar to the Single-Level One-to-One Reuse, except now instead of a one-to-one relationship, there may be one-to-many relationships. In the TABLE entity example, matching on table name is not enough, as discussed above. For example, two tables could have the same name by coincidence, but really be different data objects. In this case, the Functional Key of TABLE is expanded to be the TABLE_NAME, and all the COLUMNS that make up the table. Since a TABLE can have many COLUMNS, this is a case of single-level one-to-many reuse. For the COLUMNS to be the same, they must relate to the same underlying SYBASE_USG or ELEMENT objects. Thus, two different TABLE entities are considered the same if they have the same TABLE_NAME and their COLUMNS relate to the same underlying objects.

N-Level, One-to-Many Reuse is the most complicated reuse case. In this case an entity contains other entities that contain other entities. This can go N levels. A match is present only in the case when all N levels are the same for load and Candidate.

A good example of this case is the GROUP entity (from the COBOL and C models). A GROUP in this case can contain many elements as well as other GROUPS. These underlying GROUPS can contain themselves contain other ELEMENTS and GROUPS, etc. All the levels need to be checked and an exact match needs to be found between Source Object and Candidates.

Reuse Implementation and APIs

The user accessible reuse criteria provided by the invention are preferably implemented in consideration of the following.

Context Sensitivity: reuse checking that can distinguish between elements from different sources and can check for an element from Sybase verses COBOL for example, and thus apply different Functional Keys to the check.

Platform Independence: both database independence (e.g., Sybase. Oracle. DB2 and Informix) and operating system independence (e.g., MVS, UNIX and NT).

Performance: load data at an acceptable rate which is faster than new data is produced.

Iteration: the option to decide which reuse type will be applied to each entity, and how to process multiple or conflicting Candidate results. e.g. if one reuse criteria (that is, the Functional Key) fails, a different, perhaps more relaxed, Functional Key can be tried.

Extensibility/Reuse: In accordance with the invention, reuse criteria may be changed, extended and added to by users without an experienced programmer. Well thought-out defaults may also be provided. Reuse is preferably specified in such a way that it can easily be reused for any database or any platform.

Forgiveness: protection against accidentally harming data integrity, which implies some type of rollback or undo for a particular load.

Generation: simplifying the reuse scheme via some medium (metadata, scripting language, etc.) that can be interpreted and results in generation of the supporting code, which provides platform and database independence, and allows easy changes.

Callable API: an API that provides most of the functionality to third party programs.

The manner of selection and general descriptions of suitable APIs for loading scanned data into the repository follow.

Reuse is preferably added as another branch of Repository Services (RS). both to allow external access to the functionality, and to hide the implementation from those using the services.

Within the RS framework, there are a number of reuse implementation options to choose from, e.g., (a) a third generation language(3GL) with direct database calls (embedded SQL); (b) A 3GL with other RS calls; and (c) Stored Procedure called from RS or a 3GL.

A 3GL with direct database calls (embedded SQL) implementation has ANSI embedded SQL, in a 3GL code, that will run all the queries against the database in order to do the reusability checks. There exists a main function for every entity that does all the reusability tests using embedded cursors and queries. This function may call other functions that are relation specific and perform reuse tests for the respective relation. The advantages are that: this implementation is the most flexible; uses the full functionality of the 3GL and SQL since it has a direct access to the database; and, using ANSI SQL (vs. Stored Procedures), porting to different RDBMS is fairly easy.

The disadvantages of a 3GL with embedded SQL are that: a precompiler is needed for each of the database platforms the reuse routine is going to run against so that the reuse tool has to be compiled separately for each platform (the alternative is library calls for each RDBMS with ODBC greatly reducing this problem); and using ANSI SQL restricts use to a relational DBMS.

A 3GL with RS calls implementation uses a 3GL with calls to other RS routines to perform the reuse checks. This implementation is similar to the a 3GL with embedded SQL implementation discussed above but has have RS calls in the place of embedded SQL. The main advantage is that the RS engine isolates the reuse completely from the database so that no physical connection is needed to a database and the database platform is irrelevant (this solution from reuse's perspective is platform independent). The disadvantage is that the RS implementation does not (and will never) provide the full functionality of embedded SQL and a 3GL, and limits use to an API. For example, there is no functional key select function. The current function only selects by NAME attribute, INS_ID and VERSION. It is hard to envision the RS providing select support for objects spanning multiple underlying entities and relates.

A Stand Alone Stored Procedures implementation uses stored procedures (database run routines) that are written in a pseudo-language similar to SQL, with some constructs from a 3GL language added. These stored procedures have control flow statements, local variables, system supplied variables, parameters and the ability to return parameters back to their caller. Stored procedures can also call other stored procedures. Stored procedures are available, with different levels of functionality, in Sybase, Oracle, Informix, and DB2 4.1. They can be called using a batch file, from a 3GL or other RS.

The advantages of the Stand Alone Stored Procedures implementation are that stored procedures: are extremely fast when they are being executed because the access paths are pre-determined (like static SQL on DB2), resulting in much faster execution time, especially for queries; are user modifiable, meaning that a user can create his/her own stored procedures, which allows third party reuse support that can be built into the PCAF standard immediately; are easier to generate then a full blown 3GL; and are not compiler dependency, so field changes/additions impose no compiler/library constraints.

The main disadvantage of the Stand Alone Stored Procedures implementation is that stored procedures are not a full blown language, like C. and they have many limitations. For example, there is no pointer support, the data types available are limited to simple ones such as smallint, char etc., and the parameters that are passed in must be fixed. Other disadvantages are that: due to the differences in syntax of the stored procedures in the different platforms, different copies of each procedure are required for every platform; DB2 version 3.1 does not support stored procedures; and there is no way to pass to a stored procedure, as a parameter, a pointer to a list of all the children and parents needed for a 1-to-many reuse check. For example, when checking if a TABLE, its COLUMNS, and the underlying ELEMENTs from a load are in the repository, there is no way to pass in the N parameters (that represent the N COLUMNS of a TABLE) to the stored procedure. Another mechanism would be required, such as inserting the N children in work tables for the stored procedure to join against, for example.

There is another option which uses temporary work or control tables populated by a setup/load program at the beginning of the reuse routine. This option, called the Stored Procedures and Work Tables implementation, is the presently preferred option. The work tables contain information about all the objects that were brought in by a scan, which allows 1-to-many reuse checking. The advantages of this implementation are that it retains the advantages of Stored procedures implementation (fast, modifiable) and has the full functionality of the 3GL in the setup step. Also, the work tables are only needed for 1-to-many cases, so more simple procedures are unaffected.

The disadvantages of the Stored Procedures and Work Tables implementation are that: different copies of each procedure for every platform due to the differences in syntax of the stored procedures in the different platforms: DB2 version 3.1 does not support stored procedures; and there is performance penalty for the load.

Despite the disadvantages, the Stored Procedures and Work Tables implementation is preferred it combines the advantages of using a 3GL language with the advantages of the Stored Procedures, and has the best combination of flexibility, user access, performance, and ease of generation.

The routines of the selected reuse implementation must be automated since it would be too time and resource consuming to manually create the reuse routine for every tool. Generation of reuse routines should have the following functionality: the reuse routine creation should be automated based on the reuse rules only; the rules should be customer modifiable; customers or third parties should be able to define there own reuse rules and generate their own reuse routines; and the rules should be language and database independent.

An automated scheme should generate a reuse routine for every tool that would be able to handle all types of reuse no matter how complicated. Two candidates for specifying the reuse rules are: (a) repository held metadata, and (b) scripting language.

Regarding repository held metadata, the object definitions, their respective functional keys, and other behavior would be stored in the repository, using a custom meta-model. Either a special dialog or a generic editor would be used to populate the data. The reuse generation would read the data out of the repository to create the reuse routines. The advantages are that data store is centralized and all repository functions (impact analysis, distributed repository, RS access, etc.) are provided. The disadvantages are that repository visibility is required to load data and the overhead of editor/dialog is required to load.

Regarding scripting language, the object definition, etc. would be specified in a simple scripting language which is parsed and used to generate the reuse routines. This has the advantages that it is simple, not repository dependent, and easy to incorporate by third parties. The disadvantages are that it loses repository benefits.

A reuse script would specify the reuse schemes for every entity and relationship populated by a particular tool. The format is not as important, as long as it is easy to parse, and easy to understand. The equivalent information could easily be stored in a repository meta-model. The type of information that the scripting language would contain is shown below.

```
COBOL-ELEMENT              // reuse scheme name for the object
entity ELEMENT,
relate COB_USG;            // entities that makes up the object
ELEMENT
COBOL_DEFAULT_NAME,        // attributes of the ELEMENT
DEFAULT_TYPE,
DEFAULT_LENGTH,
DEFAULT_SCALE;
COB_USG                    // attributes of the COB_USG
COBOL_OVERRIDE_NAME,
COBOL_OVERRIDE_TYPE
CUSTOM PIC,
OCCURS_CLAUSE,
SIGNED;
FK:2                       // Number of functional keys
FK1                        // Primary functional key specification
COB_USG COBOL_OVERRIDE_NAME,  // Primary FK attributes
COB_USG COBOL_OVERRIDE_TYPE;
FK2                        // Secondary FK
ELEMENT DEFAULT_COBOL_NAME    // Secondary FK attribute
                                 list
ELEMENT DEFAULT_COBOL_TYPE;
SYBASE-TABLE               // reuse scheme name
entity TABLE,
relate COLUMN,
relate SYB_USG;            // Entities that comprise the reuse object
FK:1                       // Only one functional key
FK1
TABLE NAME                 // List of FK attributes
COLUMN NAME,
COLUMN SEQNO,
SYB_USG SYBASE_DATA_TYPE,
SYB_USG SYBASE_NAME;
```

More than one functional key can be specified for a source object. This allows a second lookup if the first lookup fails. This might allow matching on more flexible criteria a second time. The information can be extended to describe behavior if more than one candidate is returned, global behavior for all source objects (such as Life Cycle preferences), etc.

The load knows the context of an object, i.e., if a TABLE is a Sybase table or DB/2 table. The reuse routine is specified for the data to be loaded. This alerts RS on what routines to run against for the particular object being loaded.

When the reuse routine is generated it is ready for execution. The reuse routine is part of the load process for a tool. Based on the reuse checks, an entity will be added, reused or updated (merged). Updates should be limited to updating blank information, almost never changing existing information. Every tool will have a container associated with it. For example, the COBOL scanner will have its own container, Sybase will have its own container etc. A container points to all entities and relations brought in by the load, and an indicator if the object was added or updated during the load. This helps greatly in "undoing" the load.

The user will be able to reuse an old container or create a new one before every tool execution. If the customer decides to reuse an old container then all the relations to the old children of the container will be drained (deleted) in order for the new ones to come in. After the execution of the tool, the relations from the container to its children will indicate whether the child was added, updated or reused. Another option will be to delete "orphaned" objects.

PCAF File System

The following is a description of the PCAF file system used by the data repository described herein, which consists of three input files, with the filenames *.PCD, *.PCC, and *.PCR. The PCD file ("D" for "data" file) contains the actual entity and attribute data for each instance being loaded into the repository. The PCC file ("C" for "control" file) contains information describing the kinds of objects that will appear in the data file, including layout information for each entity and relationship type to be loaded. The PCR ("R" for "reuse rules" file) contains the information about each object that is being loading into the repository and the rules and processing steps to be applied during the reuse phase of the PCAF load.

Statements in PCAF files use standard comma-delimited format which ignores non-ASCII characters and tabs.

PCAF Control File

Figure 9:
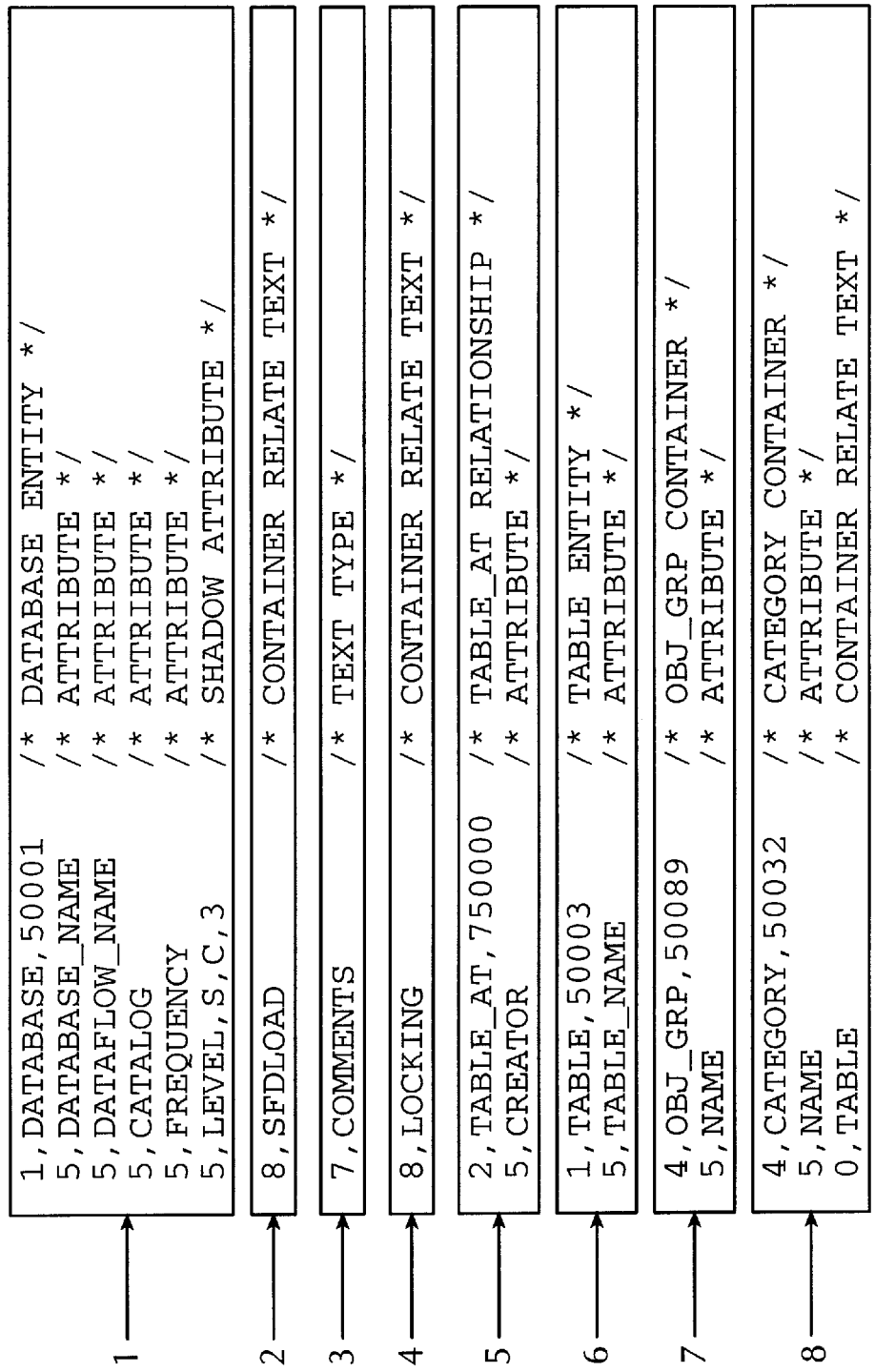
FIG. 9 depicts sample Control file Objects.

FIG. 9 shows the parts of a PCAF Control file, the formatting rules for which are as follows.

1. Title Statement: Begin every Control file with a Title Statement like the one shown in the sample file in FIG. 9. The Title Statement is required and must be the first line in the file.

2. Comments: Insert Comment lines as needed, using the /* Comment indicator. An in-line Comment, begin the Comment text with a /* indicator and end it with a */ indicator./*

3. Object Statements: Follow the Title Statement with one or more Object Statements, formatted as follows:

a. Object Type: Begin Object Statements with a valid one-digit Object Type indicator. Table 5 below shows valid Object Type indicators.

TABLE 5

| Object Type | Indicator |
|---|---|
| Entity | 1 |
| Relationship | 2 |
| Container | 4 |
| Attribute | 5 |
| Text Type | 7 |
| Container Relate Text | 8 |
| Container Relate Type Filter | 7 | b. Name: Follow the Object Type indicator with the object Name. Name is case-sensitive and cannot contain delimiters.

c. Identifier: If the object is not a Shadow attribute, follow the Name with the object's standard five-digit repository ID d. Shadow: If the object is a Shadow attribute, follow the Name with the Shadow indicator S. Shadow attributes are attributes that don't go in the repository, but are provided for extra context information. An example of a Shadow attribute would be the relative level number of a group date element in a COBOL program.

e. Data Type: If the object is a Shadow attribute, follow the Shadow indicator with the Shadow Data Type indicator. Table 6 below shows valid Shadow attribute Data Type indicators:

TABLE 6

| Data Type | Indicator |
|---|---|
| Character | C |
| Variable-length character | V |
| Short integer | S |
| Long integer | L | f. Length: If the attribute is a Shadow attribute, follow the Data Type indicator with the attribute's length in bytes.

Object Statements describing an object's attributes must immediately follow the Object Statement describing that object. For example, in the sample Control file in FIG. 9, statements for the attributes DATABASE_NAME, DATAFLOW_NAME, CATALOG, FREQUENCY, and LEVEL immediately follow the statement for the entity DATABASE.

Object Statements for an object's attributes must appear in the same order as they will appear within the corresponding object statement in the PCAF Data file. For example: If in the Control file an Object Statement is created for the DATABASE entity, and after this statement its attribute statements are ordered:

DATABASE_NAME, DATAFLOW_NAME, CATALOG,

FREQUENCY, and LEVEL, then within the Data file statement for the entity DATABASE, the attributes must be ordered:

DATABASE_NAME, DATAFLOW_NAME, CATALOG, FREQUENCY, and LEVEL.

The sample PCAF Control file (FIG. 9) breaks down into the following eight objects, as illustrated in FIG. 10.

1. The DATABASE entity and its five attributes.
2. A Container Relate Text Type that specifies text about the DATABASE associated with the container relate pointing to it.
3. A Text Type that describes text specific to each DATABASE, such as comments about the database creator and when it was created.
4. A Container Relate Text Type that describes each DATABASE.
5. The TABLE_AT relationship that describes the entities DATABASE and TABLE, and its CREATOR attribute.
6. The TABLE entity and its NAME attribute.
7. The OBJ_GRP container and its NAME attribute.
8. The CATEGORY container and its NAME attribute, with a Container Relate Type Filter. The filter specifies the object types connected to the container. In this example, CATEGORY only has container relates to the TABLE entity. However, you can apply this filtering to a list of entities you want to connect to the container.

PCAF Data File

Figure 11:
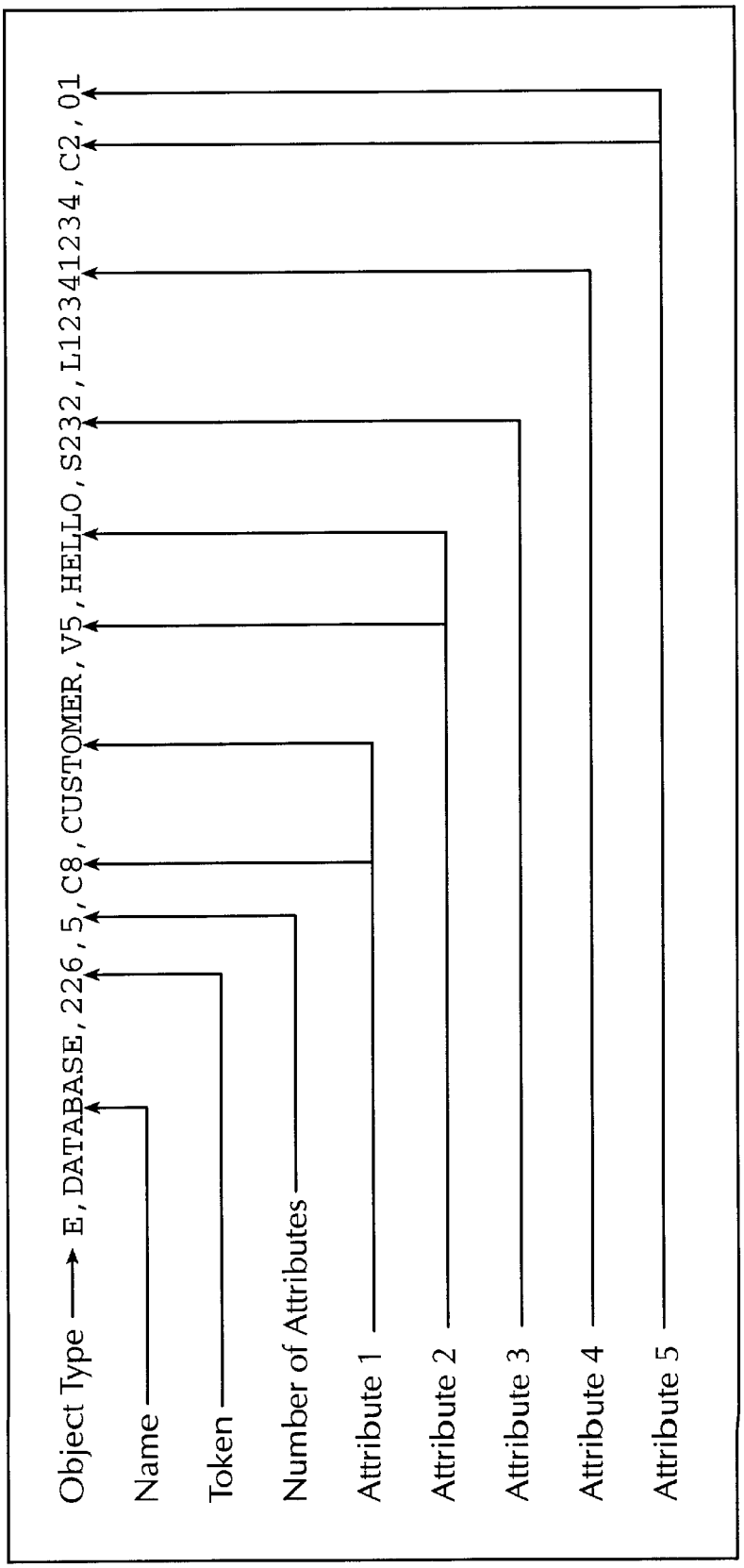
FIG. 11 depicts a sample Object Statement.

FIG. 11 shows parts of a PCAF Data file, the formatting rules for which are as follows.

1. Title Statement: Every Data file begins with a Title Statement like the one shown in the sample file. The Title Statement is required and must be the first line in the file.
2. Comments: Comment lines are inserted as needed, using the /* Comment indicator. In an in-line Comment, the Comment text must start with a /* indicator and end it with a */ indicator.
3. Object Statements: After the Title statement, one or more Object Statements are inserted. PCAF allows the creation of statements for entity, relationship, container, and text objects. Each type of object has its own formatting rules, described below.

Object Tokens: Object Tokens are used within Object Statements to link objects, to assign source and target participants for relationships and associations, and to cross reference text within the data file. A unique token number, ranging from 1 to $2^{32}$, is assigned for each instance of an object.

Figure 12:
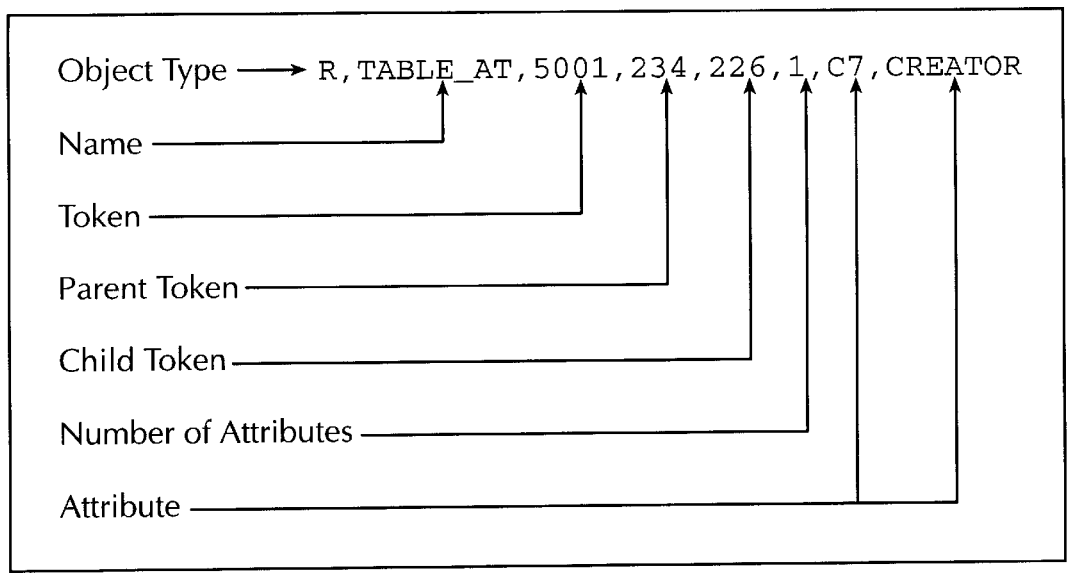
FIG. 12 depicts a sample relationship Object Statement.

FIG. 12 shows the parts of an entity Object Statement from the sample PCAF Data file. Object Statements have the following formatting rules.

1. Object Type: Begin the statement with the E Object Type indicator.

2. Name: Follow the Object Type indicator with the Name of the entity type (not the Name Attribute).

3. Token: Follow the Name with the Token.

4. Number of Attributes: Follow the Token with the Number of Attributes that you intend to define for this object. In this example, the DATABASE entity has five attributes that correspond to the five attribute statements that follow the DATABASE entity statement in the PCAF control file.

5. Attributes: Following the Number of Attributes field, define each of the entity's attributes. If more than one attribute is defined, the attribute fields must be ordered within the PCAF Data file entity statement the same way that you ordered the attribute statements that followed the entity statement in the PCAF Control file are ordered. The rules for defining each type of attribute are as follows.

a. If the attribute's Data Type is text, define it using two fields:
   1. Begin the first field with either a C (character data) or a V (variable data) and follow with the number that represents the attribute's length in bytes.
   2. Follow the first field with the attribute's value. For example, in the sample entity Object Statement, C8,CUSTOMER describes Attribute 1 as character data, eight bytes long, with a value CUSTOMER.
   b. If the attribute's data type is integer, begin the field with either an S (short) or an L (long) and follow it with the attribute's value. For example, in the sample entity Object Statement, S232 describes Attribute 3 as a short integer with a value of 232.

Figure 13:
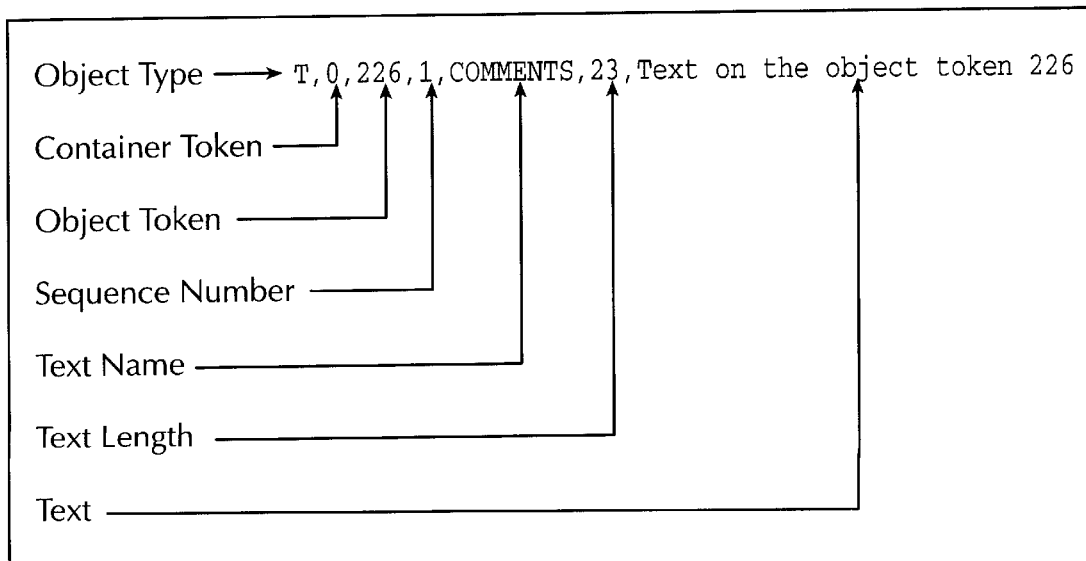
FIG. 13 depicts a sample text Object Statement.

FIG. 13 shows the parts of a relationship Object Statement from the sample PCAF Data file. The formatting rules are:

1. Object Type: Begin the statement with the R Object Type indicator.
2. Name: Follow the Object Type indicator with the Name of the relationship type.
3. Token: Follow the Name with the Token.
4. Parent Token: Follow the Token with the relationship's Parent Token.
5. Child Token: Follow the Parent Token with the relationship's Child Token.
6. Number of Attributes: Follow the Child Token with the Number of Attributes that you intend to define for this object.
7. Following the Number of Attributes field, define each of the relationship's attributes. If more than one attribute is defined, the order attribute fields must be ordered within the PCAF Data file relationship statement the same way you ordered the attributes that followed the relationship statement in the PCAF Control file are ordered. The rules for formatting each attribute type follow:

a. If the attribute's Data Type is text, define it using two fields:
   1. Begin the first field with either a C (character data) or a V (variable data) and follow with the number that represents the attribute's length in bytes.
   2. Follow the first field with the attribute's value. For example, in the sample relationship statement, C7,CREATOR describes the Attribute as character data, seven bytes long, with a value CREATOR.
   b. If the attribute's data type is integer, begin the field with either an S (short) or an L (long) and follow it with the attribute's value.

Figure 14:
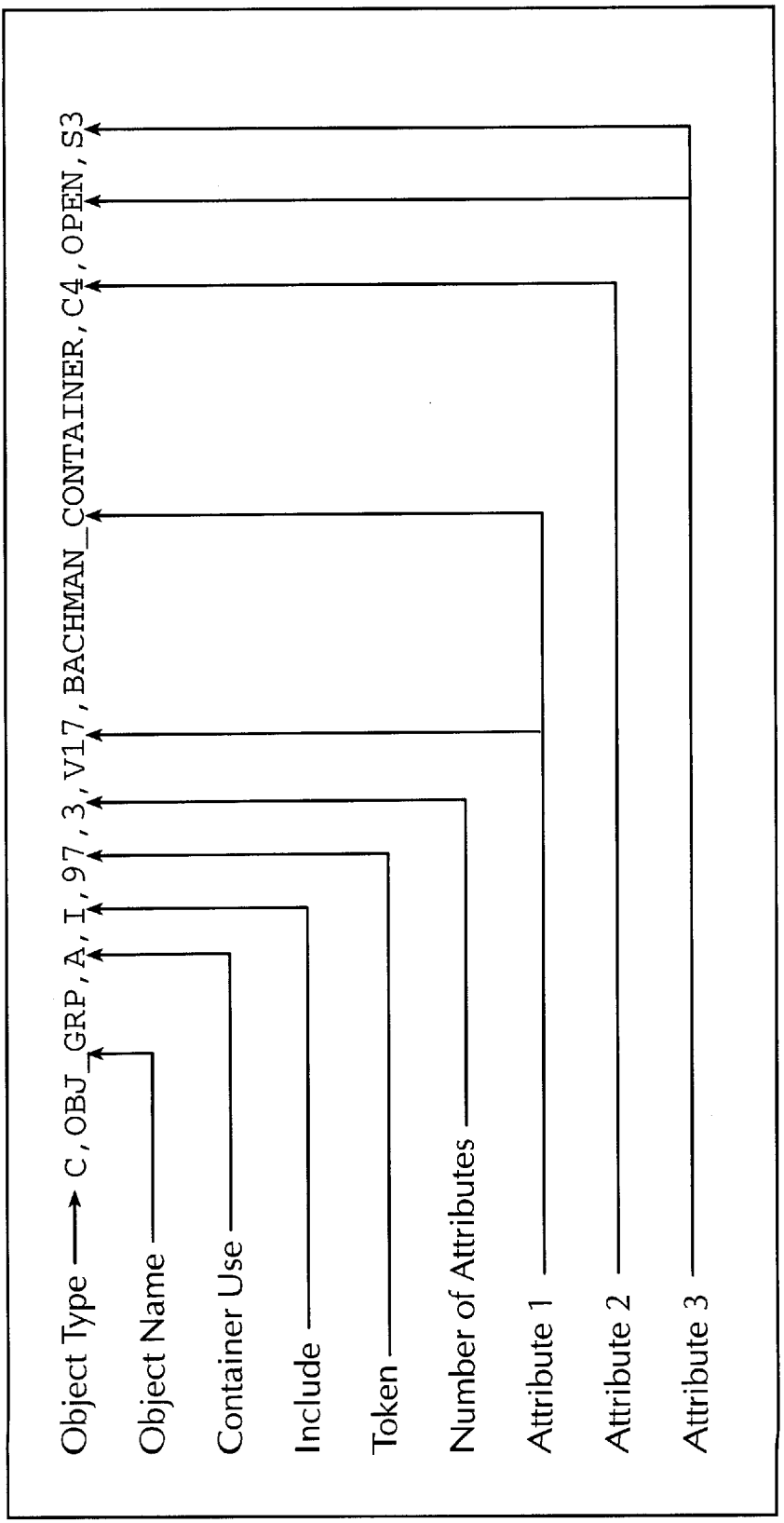
FIG. 14 depicts a sample container Object Statement.

FIG. 14 shows the parts of a text Object Statement from the sample PCAF Data file, the Formatting rules are:

1. Object Type: Begin the statement with the T Object Type indicator.

2. Container Token: Follow the Object Type indicator with the Container Token. Set this to zero (0) if the text is not container relate text.

3. Object Token: Follow the Container Token with the Object Token of the instance which owns the text.

4. Sequence Number: Follow the Object Token with the attribute's Sequence Number. When a text attribute requires more than one record in the file, the Sequence Number defines the order in which each record will be appended.

5. Text Name: Follow the Sequence Number with the Text Name.

6. Text Length: Follow the Text Name with the Text Length in bytes.

7. Text : Follow the Text Length with the actual Text.

Figure 15:
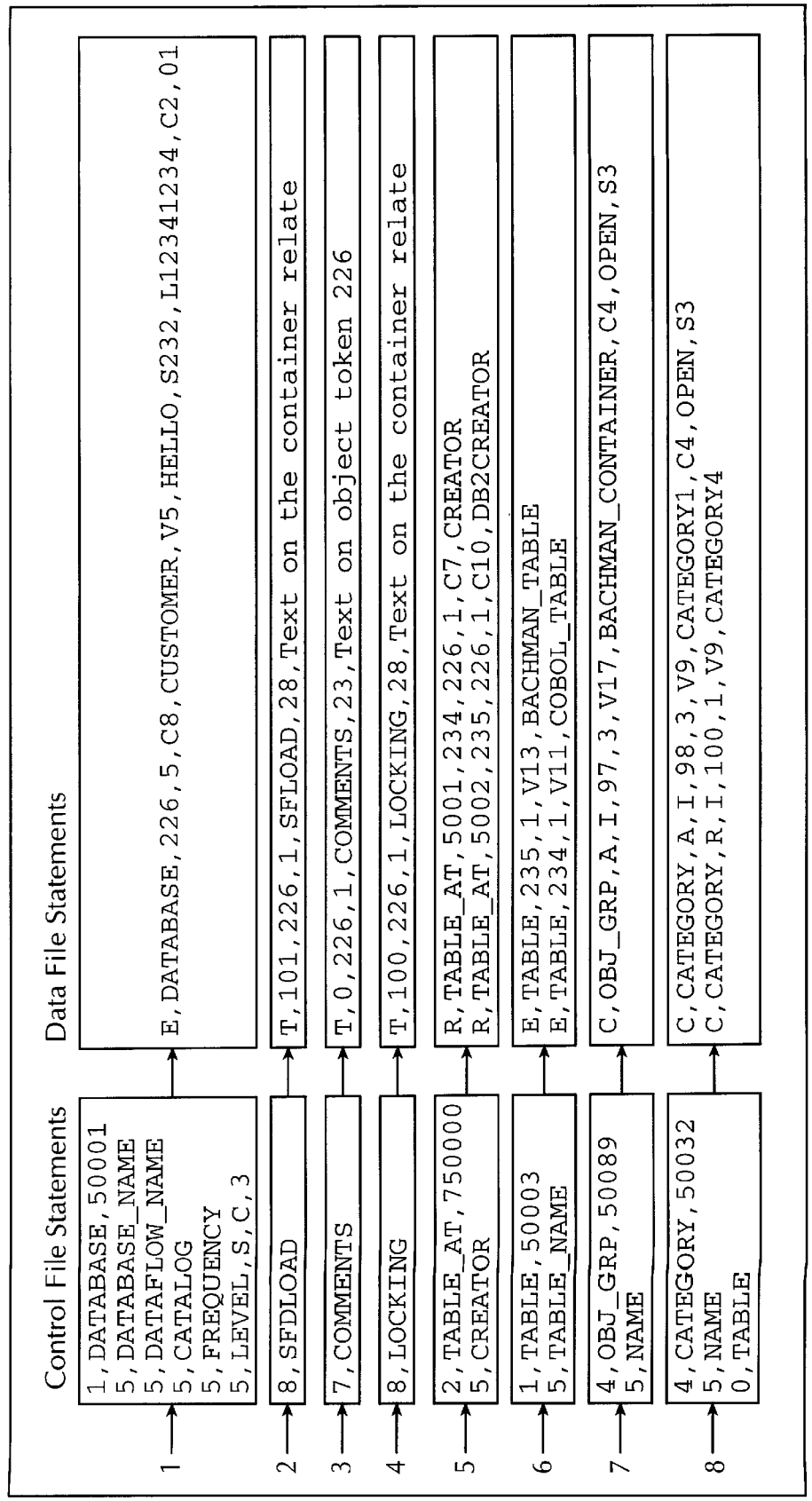
FIG. 15 depicts sample Control file Objects and corresponding Data file Statements.

FIG. 15 shows the parts of a container Object Statement from the sample PCAF Data file. The container formatting rules are:

1. Object Type: Begin the statement with the C Object Type indicator.

2. Name: Follow the Object Type indicator with the Name of the container type.

3. Container Use: Follow the Name with Container Use indicator. Table 7 shows valid Container Use indicators and their actions. If the Container Use indicator is set to A, the container's Name, Status, and Version attributes must also be defined.

TABLE 7

| Action | Indicator |
|---|---|
| Forces a search for the container in the repository based on the attributes you provide (Name, Status and Version). If the container is not found, then depending on the rules you specified in the PCR file, PR/OEE either adds it or posts an error message. | A |
| Treats the container as any entity or relationship, performs a reuse check based on the PCR file, and decides whether to reuse or add the container. | R |

4. Include: Follow the Container Use field with Include indicator I. This directs PCAF to include in the container all objects in the current PCD file, except other containers. Future PCAF versions will support other indicator values.

5. Follow the Include indicator with the intended Number of Attributes to define for this object.

6. Following the Number of Attributes field, define each of the container s attributes. If more than one attribute is defined, the attribute fields must be ordered within the PCAF Data file container statement the same way you ordered the attributes that followed the container statement in the PCAF Control file are ordered. The rules for formatting each attribute type follow:

a. If the attribute's Data Type is text, define it using two fields:

1. Begin the first field with either a C (character data) or a V (variable data) and follow with the number that represents the attribute's length in bytes.

2. Follow the first field with the attribute's value.

In the sample container statement above, V17, BACHMAN_CONTAINER describes Attribute 1 as variable data, 17 bytes long, with the value BACHMAN_CONTAINER.

b. If the attribute's data type is integer, begin the field with either an S (short) or an L (long) and follow it with the attribute's value. Note that in the sample container statement above, S3 describes Attribute 3 as a short integer with a value of three.

FIG. 16 shows the eight Control file objects and the Data file statements that correspond to them.

PCAF Rules File

The PCR file is complex, owing to the complicated nature of the information it is attempting to capture. The PCAF reuse service does SQL lookups to find instances in the repository that match the Candidate being loaded from the PCD file. Stored procedures execute these queries, both for performance reasons and to provide the ability to modify or create procedures in the field. The stored procedures used are generated from the PCR file. The PCR file consists of headers (identified by a # or $ character in the first byte) that indicate the type of information to follow, and the following records contain the information. FIG. 17 shows a sample PCR file.

The PCR file ignores leading and trailing spaces and tabs. This is useful for specifying dependent objects (see "#DEPENDENT_RELATE" discussed below). The PCR file components are discussed below.

REUSE_RULE_SET

This field appears once per PCR file, and is the name of the reuse scheme. It is one of the three required labels, and must be the first non-comment line in the file. In the sample, the following line, PRO_EXAMPLE, is the name of this reuse scheme.

REUSE_OBJECT

This field is required for each entity or relationship type to be loaded. It identifies the start of a set of reuse rules for an entity/relate. This example contains only one entity type (TABLE). For every entity type to be loaded, this block (expect for the #REUSE_RULE_SET label) would be repeated. The line following this label, "1, TABLE, 1", contains three separate pieces of information, separated by commas. The first field, 1, indicates the type of the object, 1 for entity, 2 for relationship. The second field, TABLE, is the name of the object. It must have a corresponding entry in the PCC file. The third field, 1, is the order that this object should be processed. This is important since in a one-to-many structure of N-levels (a hierarchy structure), the leaf nodes must be processed first. For objects with only a simple Functional Key that does not span multiple objects (i.e., no downward relationships), this ordering is not important. They can have any value, and it will not interfere with any other object. Not that objects that are in a dependency hierarchy don't have to be adjacent, as long as the leaves are processed at some point before their parent nodes.

ORDER_ATTRS

This field is optional and is used to sort the order of the reuse objects themselves. That is, to process TABLE in order of STATUS, status could be placed under this label, and the TABLES would come in the order of their status. Generally, this field only has to be used in the case of recursive objects (such as GROUP to GROUP) where objects of the same type are leaf nodes to objects of the same type. An example from COBOL is that 07 level GROUPs must be processed before 05 level GROUPs. Since the PCC supports shadow attributes (these are attributes that don't exist in the repository, generally temporary attributes provided for context), a shadow attribute (say, LEVEL in the COBOL example), could be created and whatever program generated the PCD file could be populated, and populate by whatever arbitrarily complex algorithm is needed to get the ordering of the relative objects correct. In the PCR file example shown here, the #ORDER_ATTRS could have been left out, since the next line in the PCR file is another label, that the fields are not sub-ordered.

DRAIN_RELATES

This optical field identifies what relationships coming off the entity to be reused should be Drained, that is, deleted, if a match is found. The rational is that in a catalog import, tables would be replaced, and the old column specification should be deleted and replaced. The following record, COLUMNS,>, contains two fields. One record would be listed for each relationship to be drained, without repeating the label (this is true for all labels). The first field, COLUMNS, indicates the entity types to be drained. The second field indicates the direction of the relationship to drain. If draining PROGRAM, for example, during a re-scan of a COBOL program, the CALLS relationships should be drained downward, but not the CALLS that point to the PROGRAM being scanned.

PROC_PREFIX

This required field is the prefix for the name of the database stored procedure used during the reuse check.

ACTION

This optical field indicates what action to take if the object is found. Currently, the actions supported are PURGE and ANCHOR. Purge indicates that if the object is found, it is to be deleted, and the object coming in will be added. This is useful for things like DB_AT during database catalog imports, since the DB_AT and all the dependent relationships will be removed. ANCHOR is used for importing relationships into the repository when the complete source/target object is not in the repository. It is a way of turning off internal referential integrity checking for the objects in the PCD file. For example, load only COLUMNS, parent TABLE and child USAGE are in the repository, in the PCD there are only entries for the COLUMN, the TABLE and the USAGE. In a normal load, this would be rejected, since the USAGE itself is a relationship, and its parent and child are not in the PCD. This is a dangling relate error, the USAGE would not go in, and as a result, the COLUMN would not go in. If the USAGE is indicated to be anchored, it is known to be in the repository, suspend parent/child checking for it is suspended. If no match for the Functional Key of the anchored object is found in the repository, an error message is generated, and any dependent objects (and their dependent objects), will not be loaded. In the sample file, there are no special actions for this object, so the label could have been left off.

DEPENDENT_RELATE

This label is optional and the section identified by this label groups all the relationships that must exist from the object in order for that object to be considered the same. Using the Sybase TABLE object example above, a TABLE is only the same if it has the same NAME and the same COLUMN relationships, with those COLUMNs themselves having the correct attribution. This section is where that is specified. The first line after the label, 2,COLUMNS,>, indicates the beginning of the group information for the relationship. The indented lines which follow complete the dependent relationship block. This block would be repeated for each relationship that the object (TABLE) is dependent upon. The change of label identifier from # to $ indicates that the labels are associated with the dependent relate. FIG. 17 shows the complete dependent relate block. The second line of the block, 2,COLUMNS,>, contains 3 fields. The first field. 2. indicates the type of the dependent object; here, it is a relationship. The second field, COLUMNS, indicates the name of the type of the dependent object. The third field is the direction of the dependent relationship. Direction is used here the same way it is used the #DRAIN_RELATE label.

$FUNCTIONAL_KEY NAME

This field is required if there is a dependent relate block. The $ label indicates it is part of the dependent relate block. The value of the field is used to distinguish between different Functional Keys for the same object.

$ATTRIBUTE_INFORMATION

This field indicates what attributes on the relationship should be used in a reuse check for the dependent relationship. In this case, there are 6 attributes for COLUMNS that must match for the column to be considered the same. All the COLUMNs of the TABLE object must match in all these attributes. If any one fails to match on even one attribute, the table will not be reused. The attribute information line consists of 3 fields, the attribute name, data type, and length, separated by a comma.

$WORK_TABLE_NAME

This field is required if there is a dependent relate block. Dependent relates are loaded into a work table in a prior step of the PCAF load. This enables all of the dependent relationships for on object to be compared to the dependent relationships for the Candidate in the repository. The following record provides the name of the work table. This value, along with the $COLUMN_INFORMATION label, describes the columns in the worktable used by the current relationship.

$COLUMN_INFORMATION

This block describes the columns of the work table used by the current relationship. Each record consists of 4 fields: The column name, the column data type, the column length, and the name of the attribute that should be placed in this column. The last two columns, SP_KEY I and SP_KEY2, are used for performance, so that when the COLUMNs in the worktable are compared to those in the repository, there are more potential join columns, both to reduce the number of Candidates and to provide a potential index join column.

FUNCTIONAL_KEY_NAME

This field is optional. The # label indicates it is part of the original object block. The value of the field is used to distinguish between different Functional Keys for the same object.

ATTRIBUTE_INFORMATION

This optional field is a list of the attributes for the object that must be the same for the object to be reused (together with any dependent relates). In this example, only the NAME must match. The record consists of three values: Attribute name, attribute data type, and attribute length.

TEXT_PROCESS

This optional field describes how text, associated with the current object will be processed if the object is to be reused. The record consists of two values: Text Process Identifier and name of the text attribute. The valid values for the text process identifier are: A and O. A means that the text from the current load should be added to the text already in the repository. O means that the text from the current load should overwrite the text in the repository.

WORK_TABLE_NAME

This optional field contains the name of the worktable where the object is referenced. Only objects that are also dependent relationships need this attribute. It is provided so that when the object is loaded from the PCD file, it will also be added to the worktable.

COLUMN_INFORMATION (1)

This optional field should only be specified if there is a worktable specified. It maps the attributes of the object to the columns of the worktable, in exactly the same way as the $COLUMN_INFORMATION.

WORK_TABLE_DEFINITION

This field is required if dependent relate entries, and contains the name of the work table that is being used by the current load. The name has to match the name provided in the $WORK_TABLE_NAME field for dependent relates.

COLUMN_INFORMATION (2)

This field is required there is a #WORK_TABLE_DEFINITION field. This field, and contains a description of all the columns on the work table. It has three entries: Column Name, Column Type and Column Length. All the columns of the table have to be presented in this format.

PCAF Load

In the preferred embodiment, the PCAF loader does not create the work table (described above); it has to be manually created. Before attempting a PCAF load (with reuse), store procedures are generated for the load using the current PCR file. Then the store procedures are loaded into the repository before running the load. If an object is not defined in the PCD file it will not be loaded in the repository. Even if reuse is not wanted for the specific object, a #REUSE_OBJECT entry and a #PROC_PREFIX entry for the object should be made. If no reuse is desired for any objects of the load, then the entry for the PCR file on the PCAF load panel should stay empty.

Once the PCD and PCC files are properly formatted, the appropriate PCAF loader is used to import the PCD data into the repository.

The processing flow of the PCAF loader is as follows:

1. Read control information from the PCC file and store it in memory.

2. Using the control information, parse the PCD file and store it in memory, then perform consistency checks on the data to ensure referential integrity.

3. Load work tables with instance data needed for certain types of reuse (including the relationships of those objects with cross-attribute Functional Keys), such as in the Sybase Table Object example discussed above.

4. Before loading an object, call the reuse service (API). If reuse finds an object in the repository that matches the Candidate to be inserted, the object is substituted in the memory model of the instances built from the PCD file, including updating the source and target IDs of any relationships that refer to the Candidate. If an object is found that matches, no insert need be performed; the object is already in the repository.

Modifying Reuse in an existing PCR file in the current embodiment requires reuse implementation before the PCAF loader can apply the new reuse rules during a load. To implement a modified PCR file for ORACLE or Sybase, for example, create ORACLE package and body procedures or Sybase stored procedures (as appropriate for a given repository data store) for the new reuse rules, and load these procedures into the repository. To use the new reuse rules, all of the steps must be performed in the following procedure successfully before performing the first PCAF load. Implementing a modified PCR file is a one-time procedure. Once the file has been successfully implemented, it does not have to be implemented again unless it is modified again.

A more detailed flow control for reuse is given below.

Parse Control File
Parse Data File
Hook Up Relates in INST Collection
Reuse Setup
Reuse Work Table Load
Reuse Ordering
Iterate through Collection:
    Reuse Candidate Check—Call stored procedure with relevant INST values
    Process INST based on return values—These API will keep the collection relates, etc. in synch with the updated INST
    Add
    Update/Merge
    Use As Is—(Perfect)
    Purge
    Drain
    Update Work Table (Ins Id, etc..)

While the invention has been described and illustrated in connection with preferred embodiments, many variations and modifications, as will be evident to those skilled in this art, may be made without departing from the spirit and scope of the invention. Further details regarding the repository described herein may be found in the reference materials listed in Appendix A hereto. The contents of all of these reference materials are incorporated herein by reference. The invention as set forth in the appended claims is thus not to be limited to the precise details of construction set forth above as such variations and modifications are intended to be included within the spirit and scope of the invention as defined in the appended claims.

We claim:

1. In a repository which stores metadata relating to data stored in one or more databases, which includes a repository database in which the metadata is stored, one or more scanners each of which scans at least one database and obtains metadata therefrom, and one or more loaders each of which loads metadata obtained by at least one scanner into the repository database in accordance with reuse procedures which govern reuse of metadata already stored in the repository database;

wherein the improvement comprises a data storage medium in which the reuse procedures are stored separate from repository program code and wherein the reuse procedures are accessible for change by a user of the repository.

2. The repository of claim 1 wherein the data storage medium stores the reuse procedures on a non-programming level such that the user can change the reuse procedures without changing program code.

3. The repository of claim 2 wherein the data storage medium stores the reuse procedures as reuse files.

4. A repository which stores metadata relating to data stored in one or more databases, comprising;

a repository database in which the metadata is stored;

a data storage medium in which reuse procedures governing reuse of metadata already stored in the repository database are stored in one or more reuse files separate from repository program code, wherein the reuse procedures are accessible for change by a user of the repository;

one or more scanners each of which scans at least one database, obtains metadata therefrom and stores the metadata in at least one file which contains the scanned metadata and associated control information for loading the metadata in the repository database;

one or more loaders each of which loads metadata from at least one file in accordance with the associated control information and reuse procedures.

5. The repository of claim 4 wherein the data storage medium stores the reuse procedures on a non-programming level such that the user can change the reuse procedures without changing program code.

6. The repository of claim 4, wherein each scanner stores metadata from a scan in a data file which is associated with control information in a control file for loading the metadata in the associated data file into the repository database in accordance with reuse procedures in an associated reuse file.

7. A method for populating a repository with metadata relating to data stored in at least one database, comprising;

scanning a database and obtaining metadata relating to data stored in the database;

storing reuse procedures which govern reuse of metadata already stored in the repository separate from repository program code, wherein the reuse procedures are accessible for change by a user of the repository;

searching the repository for metadata that matches metadata obtained from scanning the database in accordance with the reuse procedures; and loading into the repository metadata obtained from scanning for which matching metadata was not found from searching the repository.

8. The method of claim 7 wherein the step of storing the resuse procedures comprises storing the reuse procedures on a non-programming level such that the user can change the reuse procedures without changing program code.

9. The method of claim 8 wherein the step of storing the reuse procedures comprises storing the reuse procedures as reuse files.

10. The method of claim 9 wherein the step of scanning a database and obtaining metadata comprises storing the metadata in a data file which is associated with control information in a control file for loading the metadata in the associated data file into the repository in accordance with reuse procedures in an associated reuse file.

11. A method for populating a repository with metadata relating to data stored in at least one relational database which stores data objects having attributes, comprising:

scanning a data base and obtaining information relating to objects stored in the database;

creating a file or set of files for each object stored in the database containing (a) metadata about the object obtained from scanning, (b) control information for loading the metadata about the object into the repository and (c) reuse procedures for determining whether information about the object obtained from scanning already exits in the repository, with at least the reuse procedures being accessible to a user of the repository separate from repository program code such that the user can change the reuse procedures;

searching the repository for metadata that matches metadata about an object obtained from scanning the database in accordance with the reuse procedures; and loading into the repository metadata about an object obtained from scanning for which matching metadata was not found from searching the repository, the loading being performed in accordance with the control information associated with the object being loaded.

12. The method of claim 11 wherein the step of creating a file or set of files comprises creating a reuse file on a non-programming level for the reuse procedures such that the user can change the reuse procedures without chancing program code.

13. The method of claim 12 wherein the step of creating a file or set of files comprises creating a data file for the metadata and a control file for the control information.

* * * * *